United States Patent
Kokawa et al.

(10) Patent No.: US 12,170,173 B2
(45) Date of Patent: Dec. 17, 2024

(54) MULTILAYER CERAMIC CAPACITOR

(71) Applicant: Murata Manufacturing Co., Ltd., Nagaokakyo (JP)

(72) Inventors: Shinichi Kokawa, Nagaokakyo (JP); Satoshi Maeno, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 133 days.

(21) Appl. No.: 17/974,583

(22) Filed: Oct. 27, 2022

(65) Prior Publication Data

US 2023/0162922 A1     May 25, 2023

(30) Foreign Application Priority Data

Nov. 19, 2021   (JP) ................................. 2021-188967

(51) Int. Cl.
| | |
|---|---|
| *H01G 4/30* | (2006.01) |
| *H01G 2/06* | (2006.01) |
| *H01G 4/012* | (2006.01) |
| *H01G 4/232* | (2006.01) |

(52) U.S. Cl.
CPC ............... *H01G 4/30* (2013.01); *H01G 2/065* (2013.01); *H01G 4/012* (2013.01); *H01G 4/232* (2013.01)

(58) Field of Classification Search
None
See application file for complete search history.

(56) References Cited

U.S. PATENT DOCUMENTS

| | | | | |
|---|---|---|---|---|
| 4,750,084 | A * | 6/1988 | Nikaidoh | H01G 4/30 29/25.42 |
| 8,995,109 | B1 * | 3/2015 | Tsutsumi | B32B 37/24 361/301.4 |
| 2012/0229952 | A1* | 9/2012 | Kim | H01G 4/248 29/25.42 |
| 2014/0022690 | A1* | 1/2014 | Kim | H01G 4/12 361/301.4 |

(Continued)

FOREIGN PATENT DOCUMENTS

| | | |
|---|---|---|
| JP | 2016157904 A | 9/2016 |
| JP | 2018190952 A | 11/2018 |

(Continued)

*Primary Examiner* — Eric W Thomas
(74) *Attorney, Agent, or Firm* — Keating & Bennett, LLP

(57) ABSTRACT

A multilayer ceramic capacitor includes a substantially rectangular parallelepiped multilayer body including dielectric ceramic layers and internal electrode layers laminated alternately in the lamination direction, first and second main surfaces opposed to each other in the lamination direction, first and second lateral surfaces opposed to each other in the width direction orthogonal or substantially orthogonal to the lamination direction, and first and second end surfaces opposed to each other in the length direction orthogonal or substantially orthogonal to the lamination direction and the width direction, and a pair of external electrodes at both ends of the multilayer body in the length direction to cover at least the first and second end surfaces, and connected to the internal electrode layers. A first protrusion is provided at each of four corners on a surface of at least one of the first and second main surfaces having a substantially rectangular shape.

9 Claims, 22 Drawing Sheets

(56) References Cited

U.S. PATENT DOCUMENTS

| | | | |
|---|---|---|---|
| 2015/0041194 A1* | 2/2015 | Shim | H01G 2/065 |
| | | | 361/301.4 |
| 2018/0323010 A1 | 11/2018 | Park et al. | |
| 2021/0335550 A1 | 10/2021 | Ikeda | |

FOREIGN PATENT DOCUMENTS

| | | |
|---|---|---|
| JP | 2019-009463 A | 1/2019 |
| KR | 20210130645 A | 11/2021 |

* cited by examiner

FIG. 5
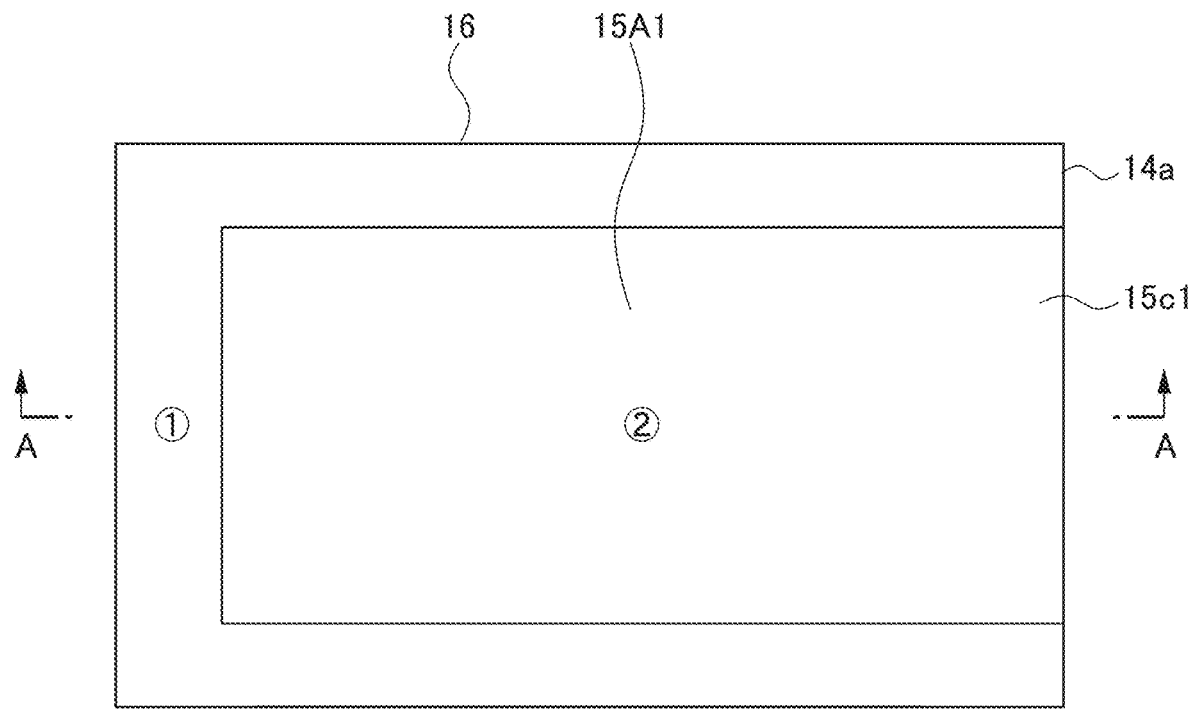
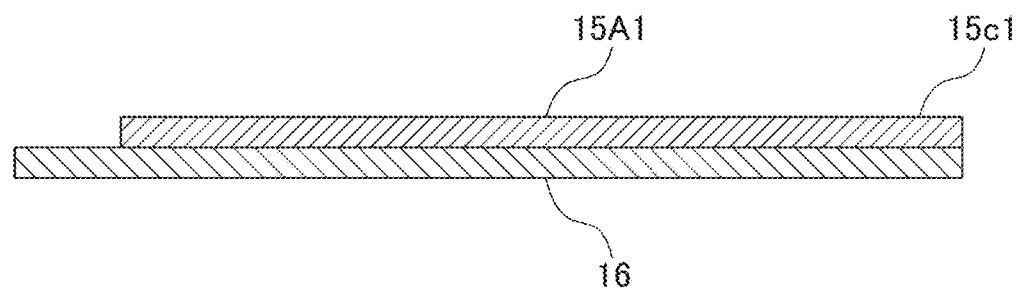

FIG. 6
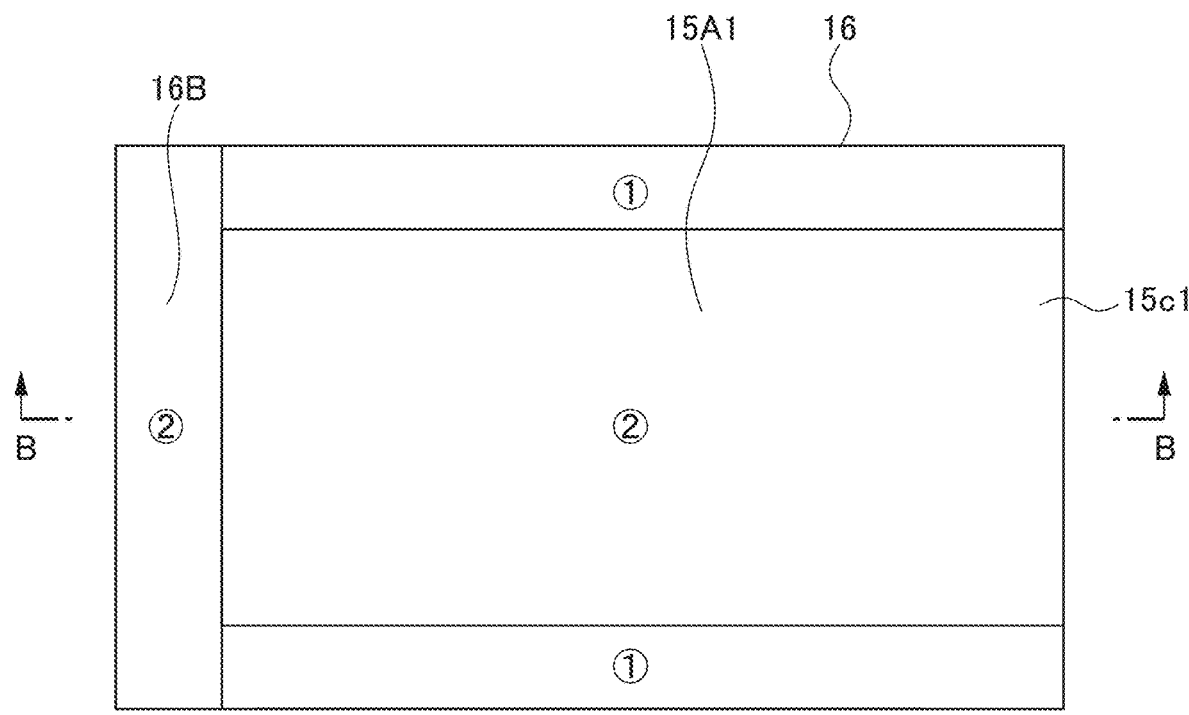
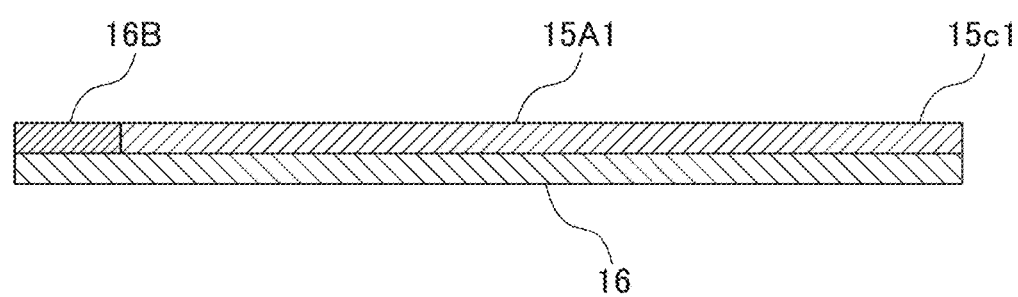

FIG. 7
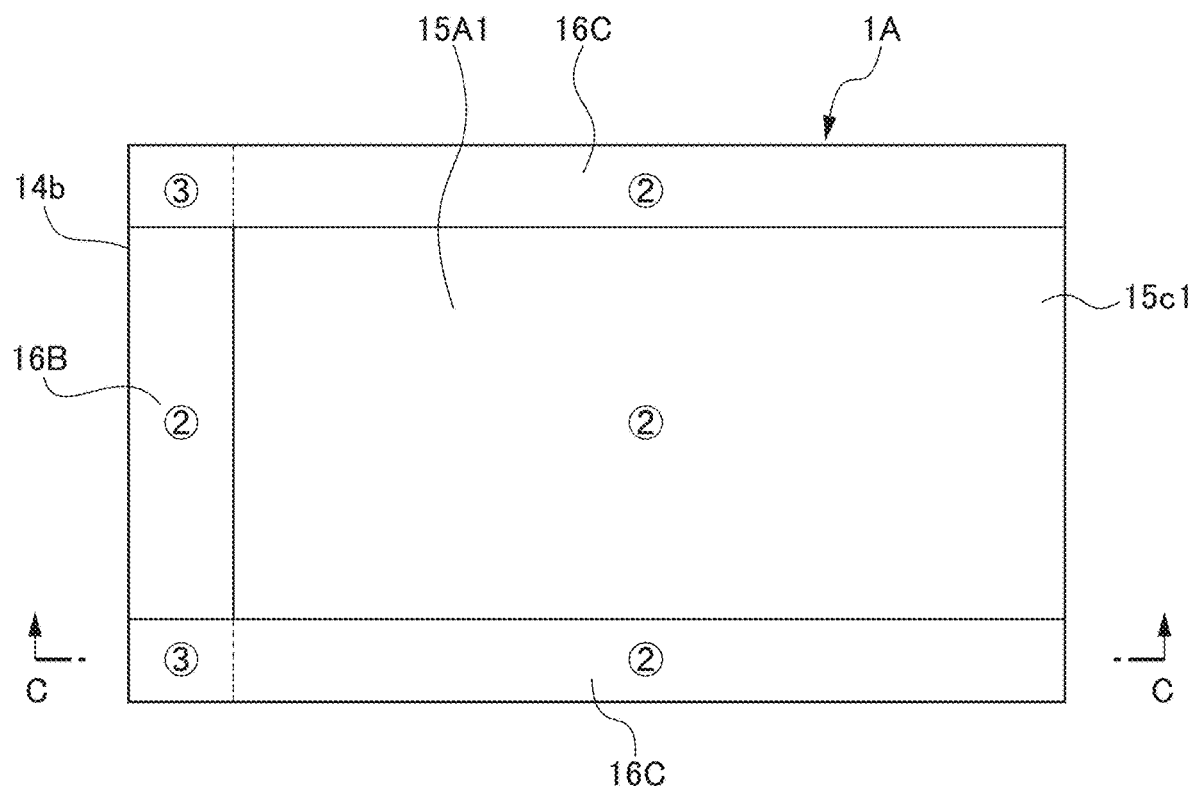
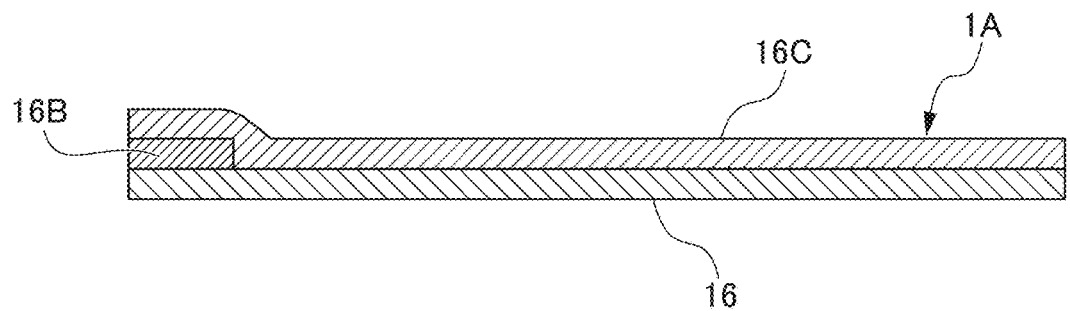

FIG. 8
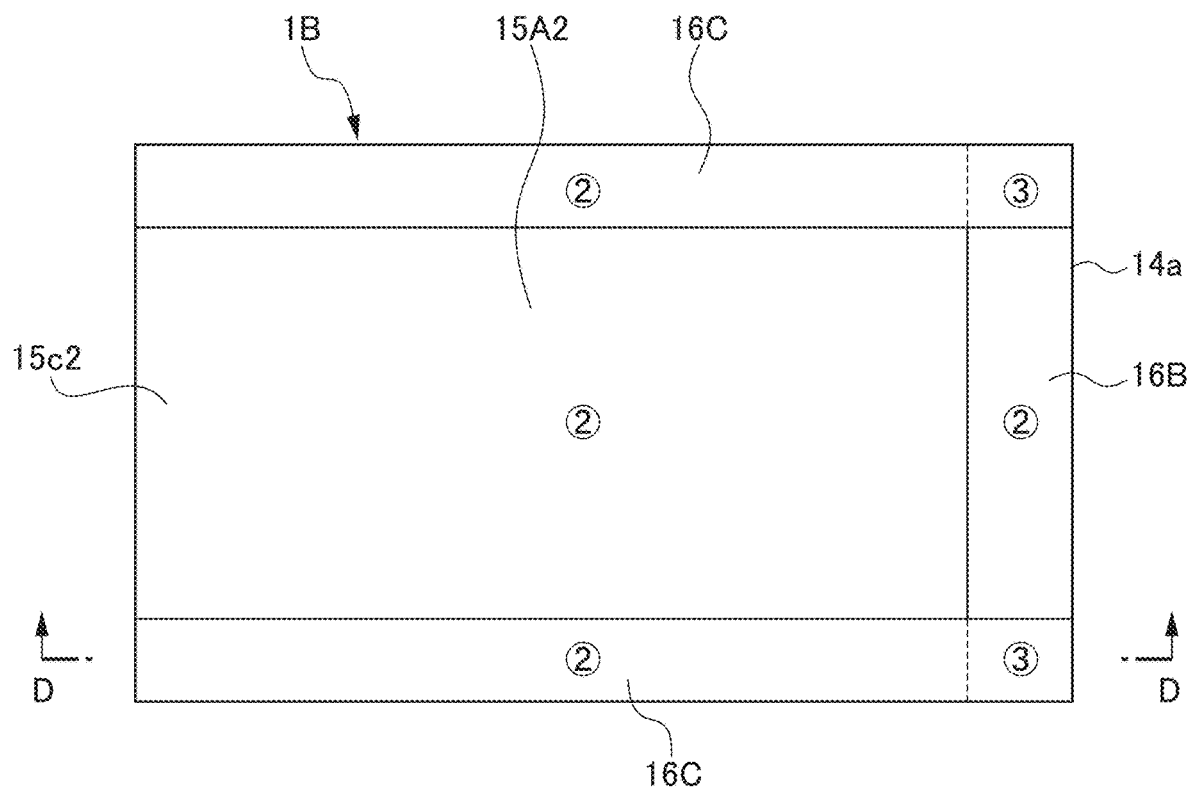
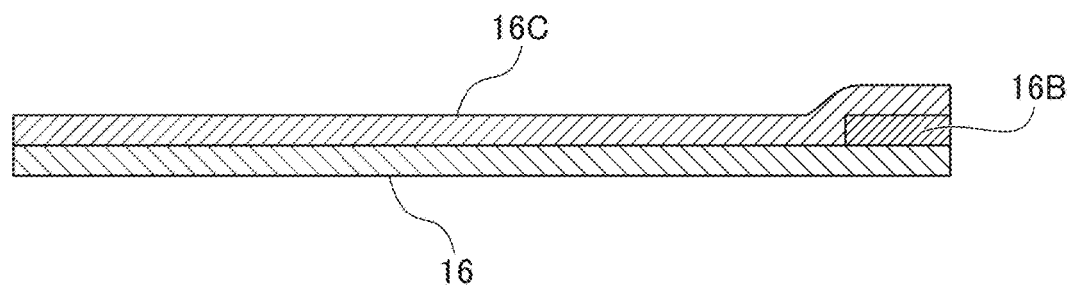

FIG. 10
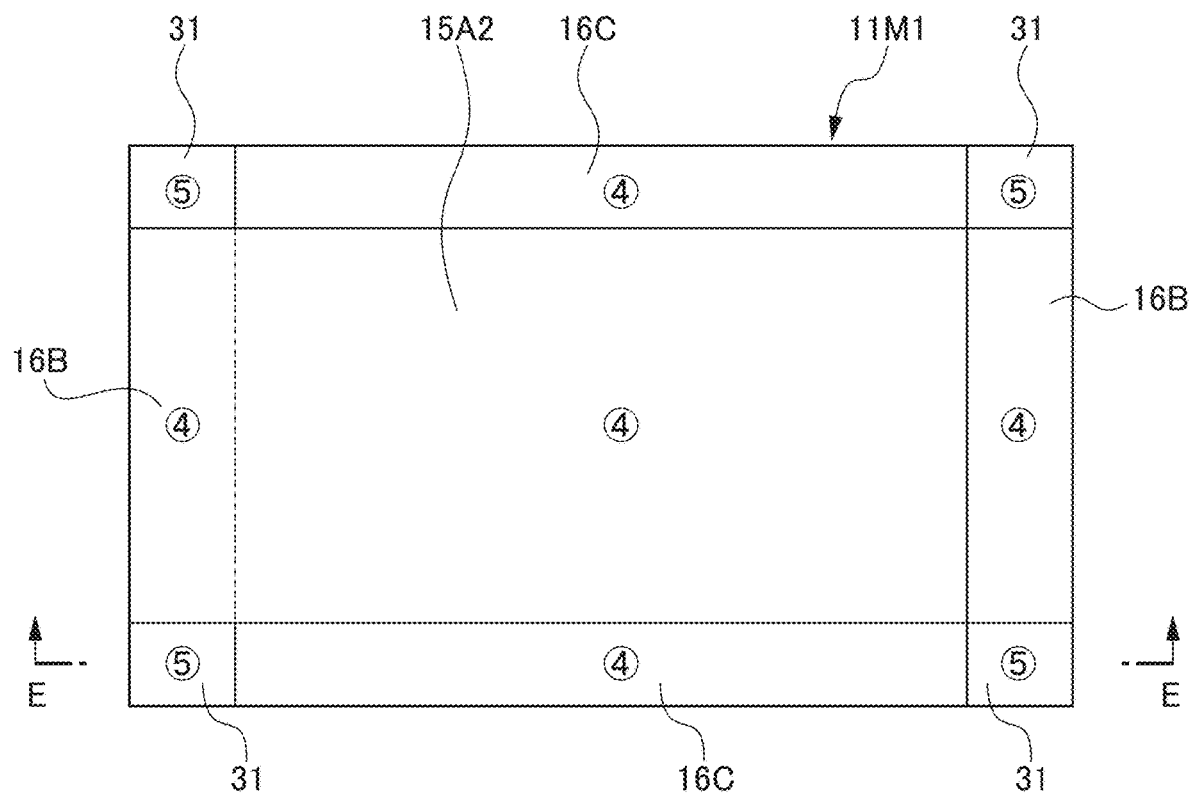
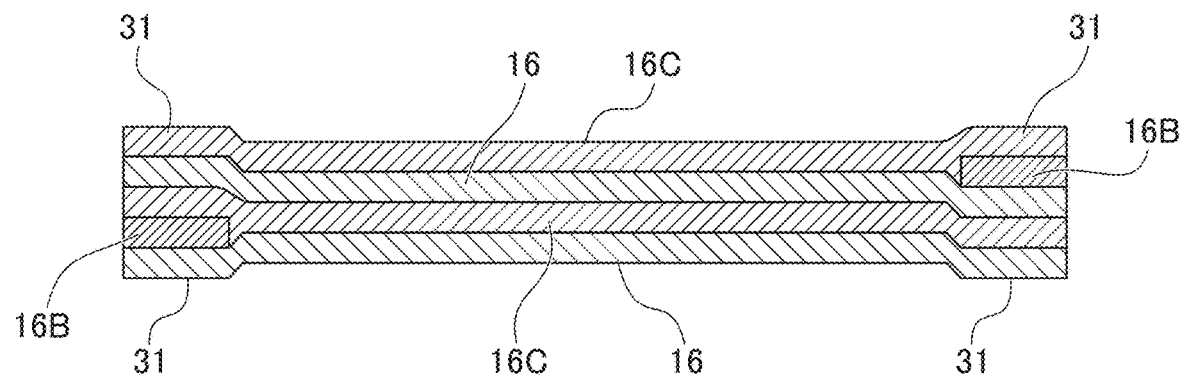

FIG. 15
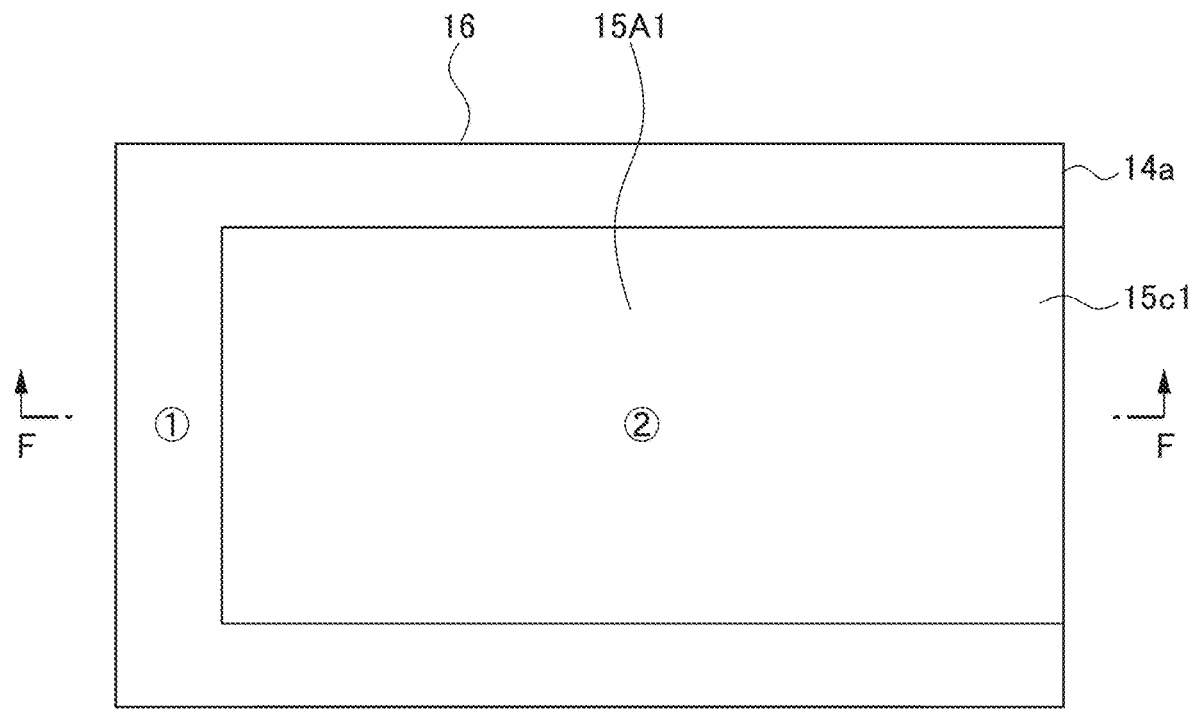
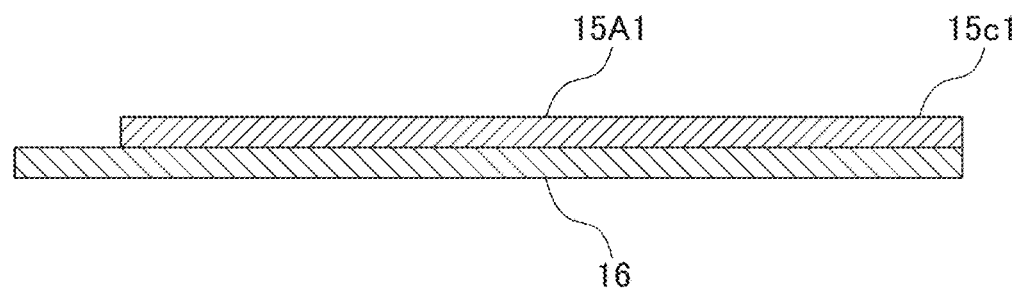

FIG. 16
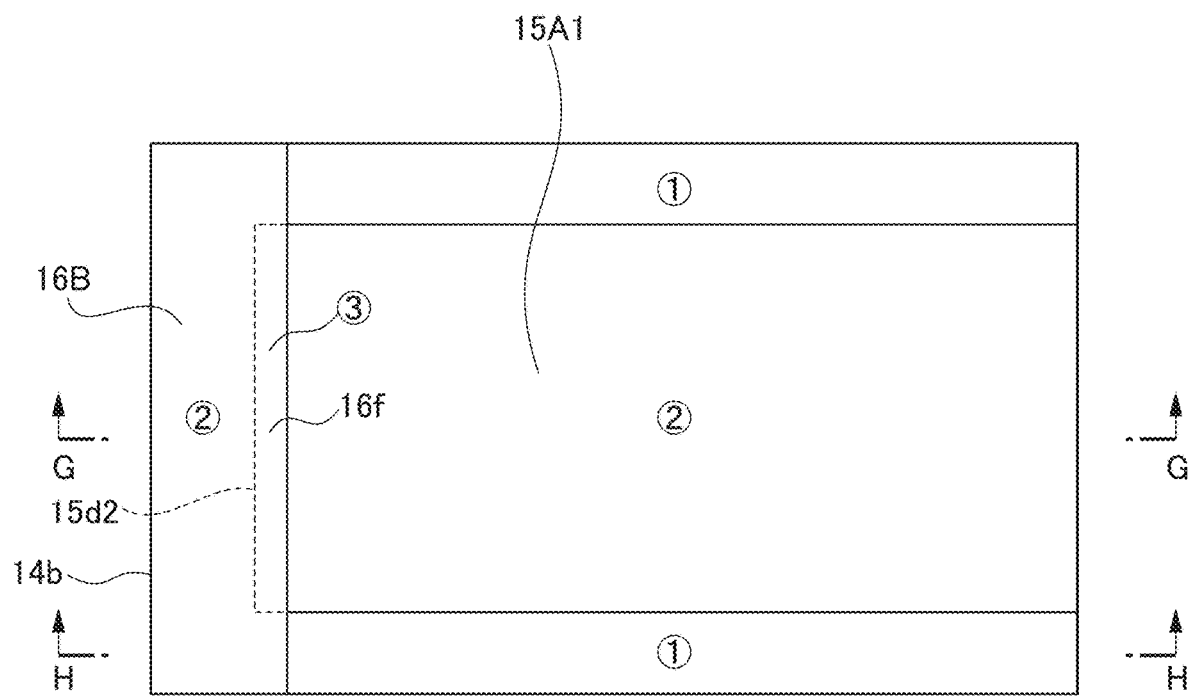
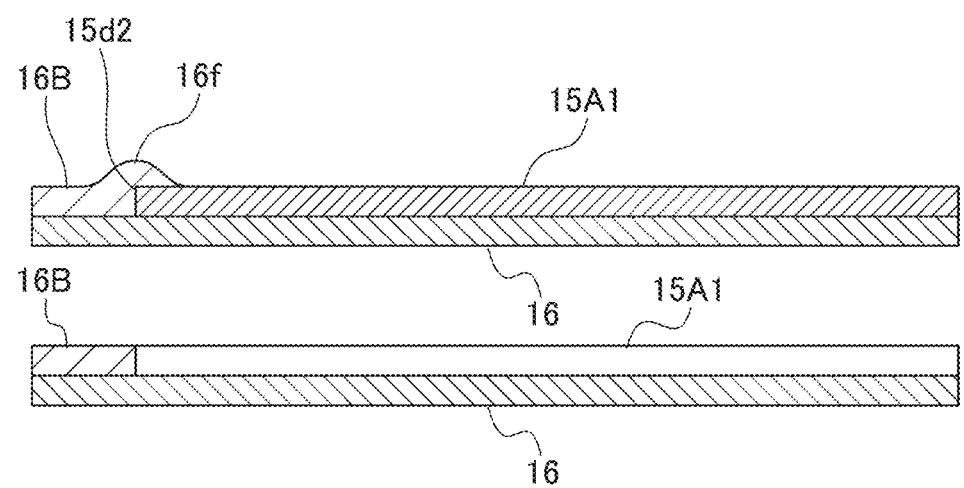

FIG. 17
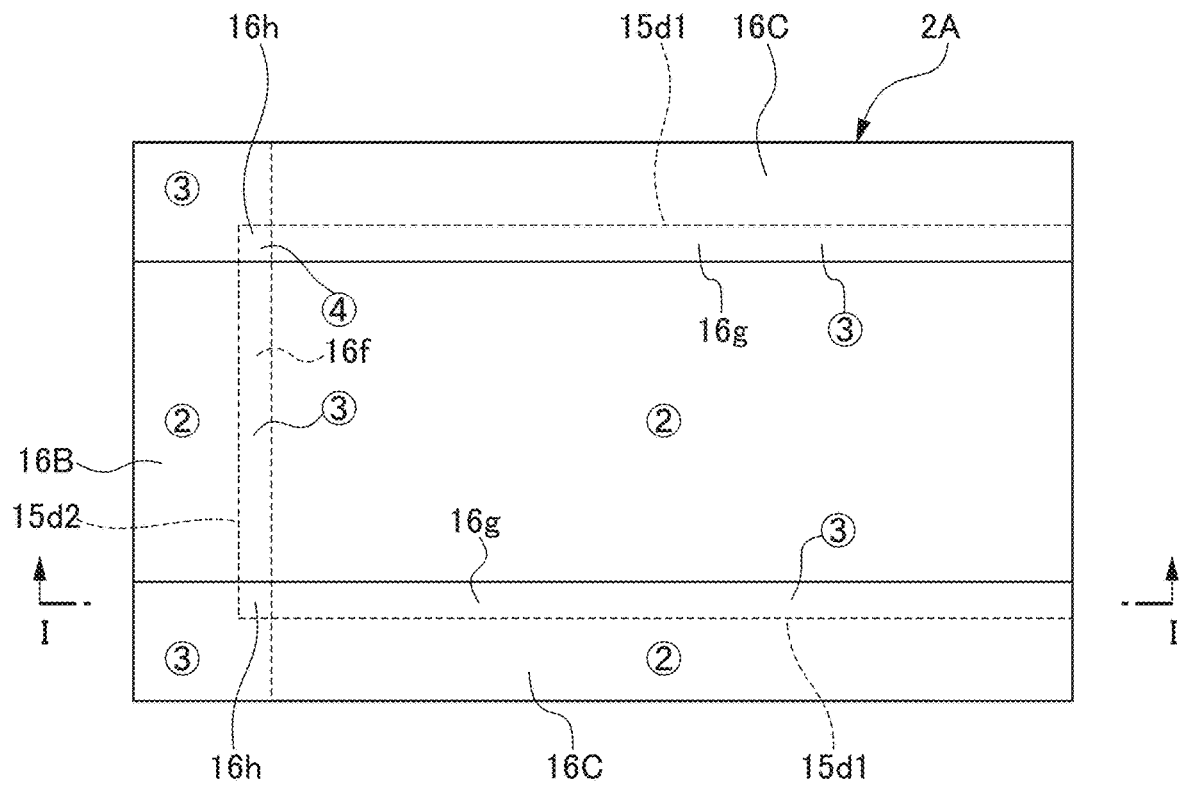
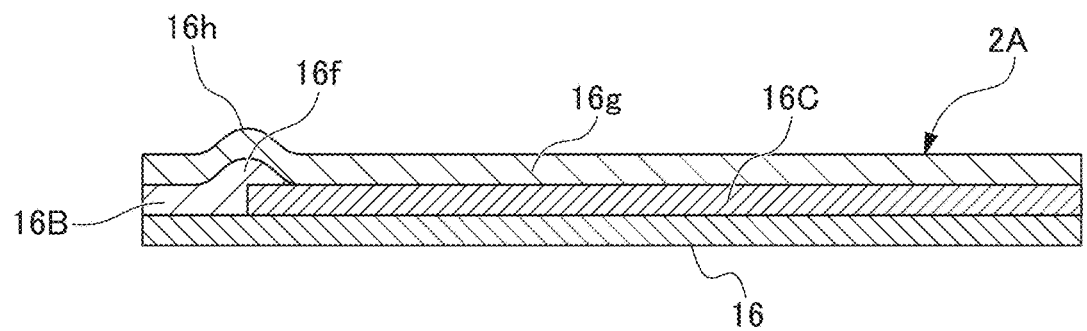

MULTILAYER CERAMIC CAPACITOR

CROSS REFERENCE TO RELATED APPLICATIONS

This application claims the benefit of priority to Japanese Patent Application No. 2021-188967, filed on Nov. 19, 2021. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, there has been known a substantially rectangular parallelepiped multilayer ceramic capacitor including a stacked multilayer body in which dielectric ceramic layers and internal electrode layers are alternately laminated in the lamination direction, and a pair of external electrodes provided at both ends in the length direction of the multilayer body and connected to the internal electrode layers. Japanese Unexamined Patent Application Publication No. 2019-9463 discloses a multilayer ceramic capacitor in which the thickness in the lamination direction of the outer peripheral portion is smaller than that of the center portion in which all the internal electrode layers are laminated due to the laminated structure of the internal electrode layers.

In the multilayer ceramic capacitor disclosed in Japanese Unexamined Patent Application Publication No. 2019-9463, the posture of the multilayer ceramic capacitor mounted on the board tends to become unstable when the multilayer ceramic capacitor is mounted on the board. For this reason, there is a concern that it is difficult to perform a mounting operation such as soldering.

SUMMARY OF THE INVENTION

Preferred embodiments of the present invention provide multilayer ceramic capacitors that are each able to maintain a stable posture during mounting.

A preferred embodiment of the present invention provides a multilayer ceramic capacitor including a rectangular or substantially rectangular parallelepiped multilayer body including a plurality of dielectric ceramic layers and a plurality of internal electrode layers laminated alternately in a lamination direction, the multilayer body further including a first main surface and a second main surface which are opposed to each other in the lamination direction, a first lateral surface and a second lateral surface which are opposed to each other in a width direction orthogonal or substantially orthogonal to the lamination direction, and a first end surface and a second end surface which are opposed to each other in a length direction orthogonal or substantially orthogonal to the lamination direction and the width direction, and a pair of external electrodes that are provided at two ends of the multilayer body in the length direction to cover at least the first end surface and the second end surface, and connected to the internal electrode layers, in which a first protrusion is provided at each of four corners on a surface of at least one selected from the first main surface and the second main surface having a substantially rectangular shape.

According to the preferred embodiments of present invention, it is possible to provide multilayer ceramic capacitors that are each able to maintain a stable posture during mounting.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a view schematically showing a first stage of a manufacturing method in which a first protrusion according to the first preferred embodiment of the present invention can be formed, in which the upper figure is a plan view and the lower figure is a cross-sectional view taken along the line A-A in the plan view of the upper figure.

FIG. 6 schematically shows a second stage of the manufacturing method, in which the upper figure is a plan view and the lower figure is a cross-sectional view taken along the line B-B in the plan view of the upper figure.

FIG. 7 schematically shows a third stage of the manufacturing method, in which the upper figure is a plan view and the lower figure is a cross-sectional view taken along the line C-C in the plan view of the upper figure.

FIG. 8 is a view schematically showing a fourth stage of the manufacturing method, in which the upper figure is a plan view and the lower figure is a cross-sectional view taken along the line D-D in the plan view of the upper figure.

FIG. 10 is a view of a multilayer body model according to the first preferred embodiment of the present invention obtained by the above manufacturing method, in which the upper figure is a plan view, and the lower figure is a cross-sectional view taken along the line E-E in the plan view of the upper figure.

FIG. 15 is a view schematically showing a first stage of the manufacturing method in which the second protrusion according to the second preferred embodiment of the present invention can be formed, in which the upper figure is a plan view and the lower figure is a cross-sectional view taken along the line F-F in the plan view of the upper figure.

FIG. 16 is a view schematically showing a second stage of the manufacturing method, in which the upper figure is a plan view, and the lower figures are cross-sectional views taken along the lines G-G and H-H in the plan view of the upper figure.

FIG. 17 is a view schematically showing a third stage of the manufacturing method, in which the upper figure is a plan view and the lower figure is a cross-sectional view taken along the line I-I in the plan view of the upper figure.

DETAILED DESCRIPTION OF THE PREFERRED EMBODIMENTS

Hereinafter, preferred embodiments of the present invention will be described with reference to the drawings.

First Preferred Embodiment

Figure 1:
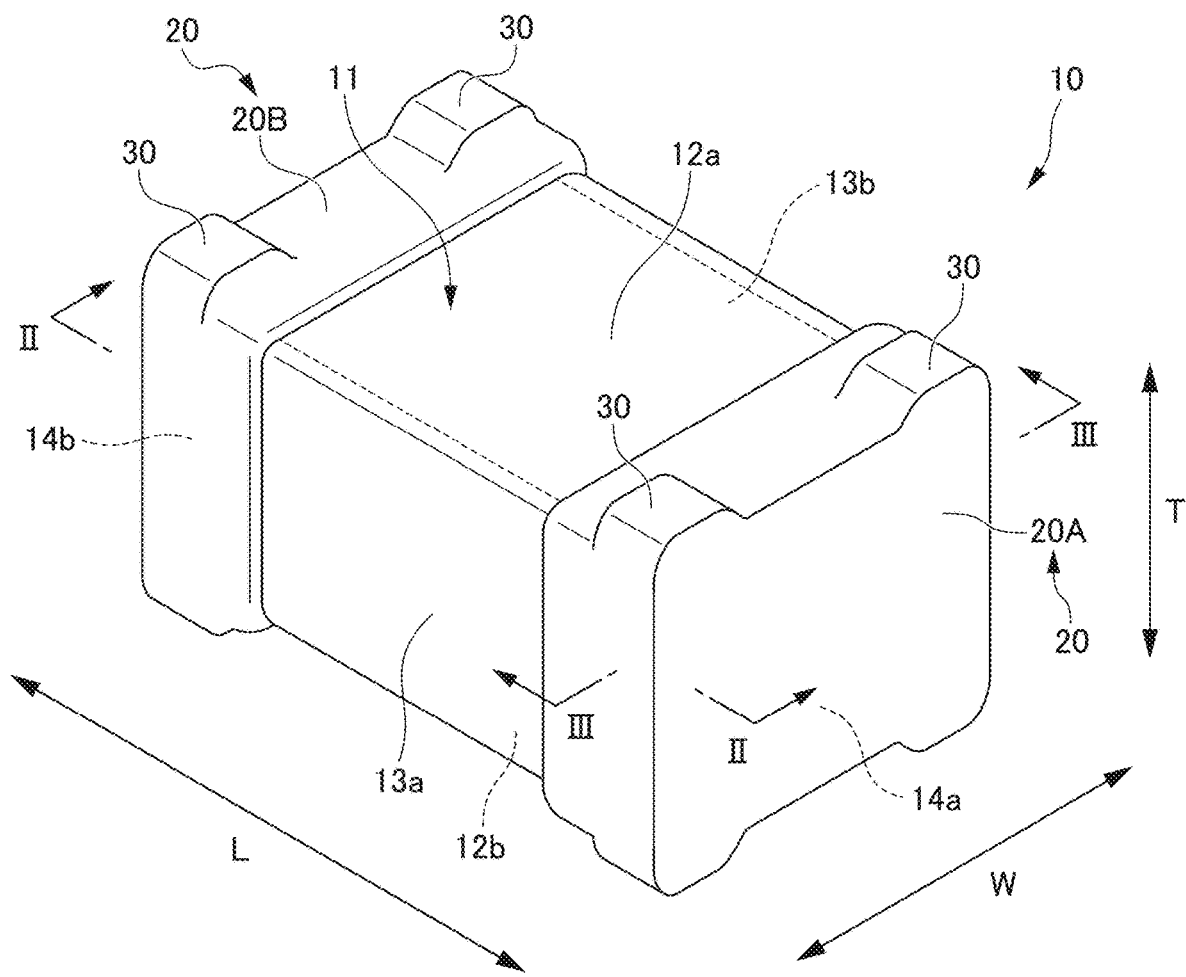
FIG. 1 is an external perspective view of a multilayer ceramic capacitor according to a first preferred embodiment of the present invention.
Figure 2:
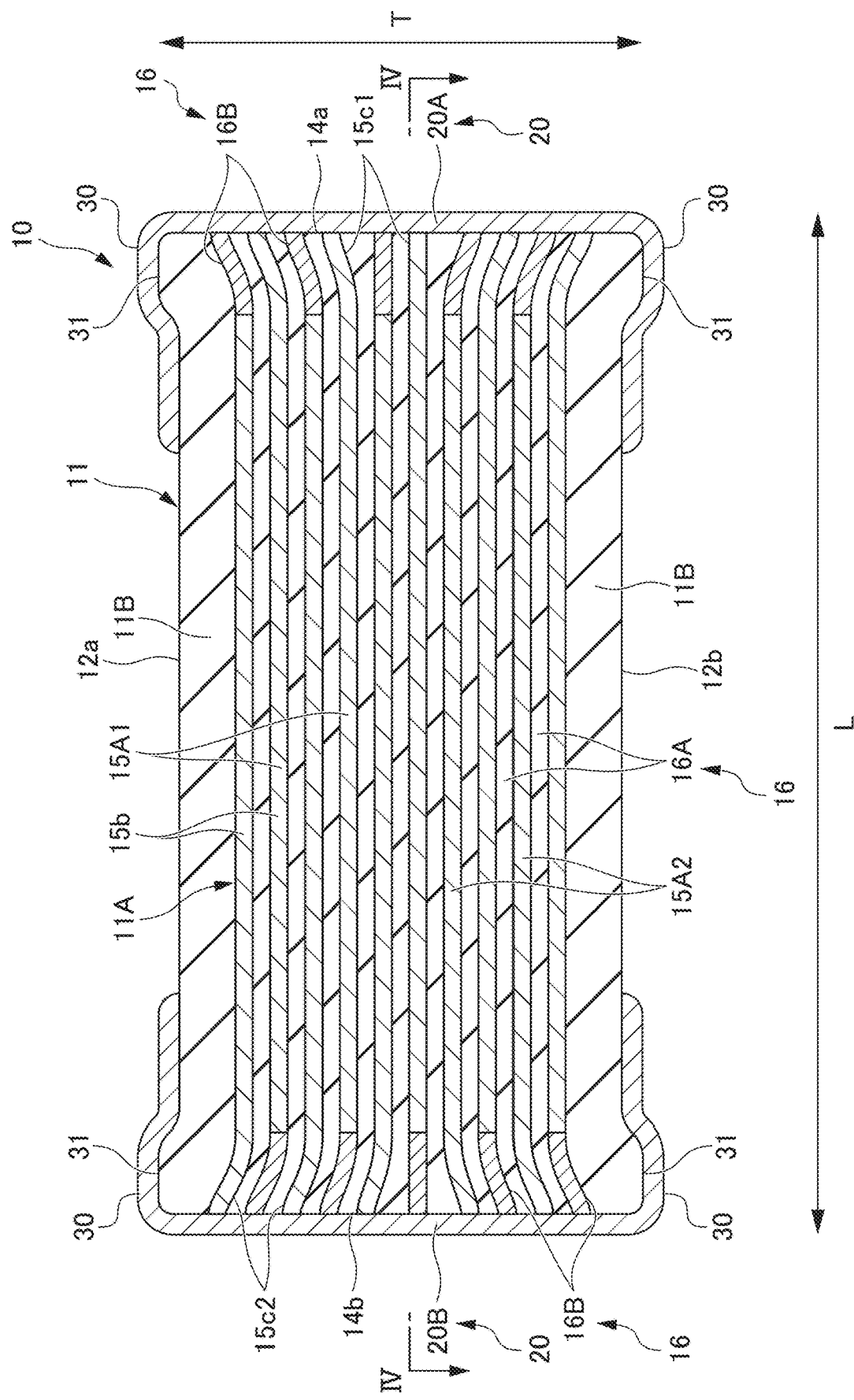
FIG. 2 is a cross-sectional view taken along the line II-II of FIG. 1.
Figure 3:
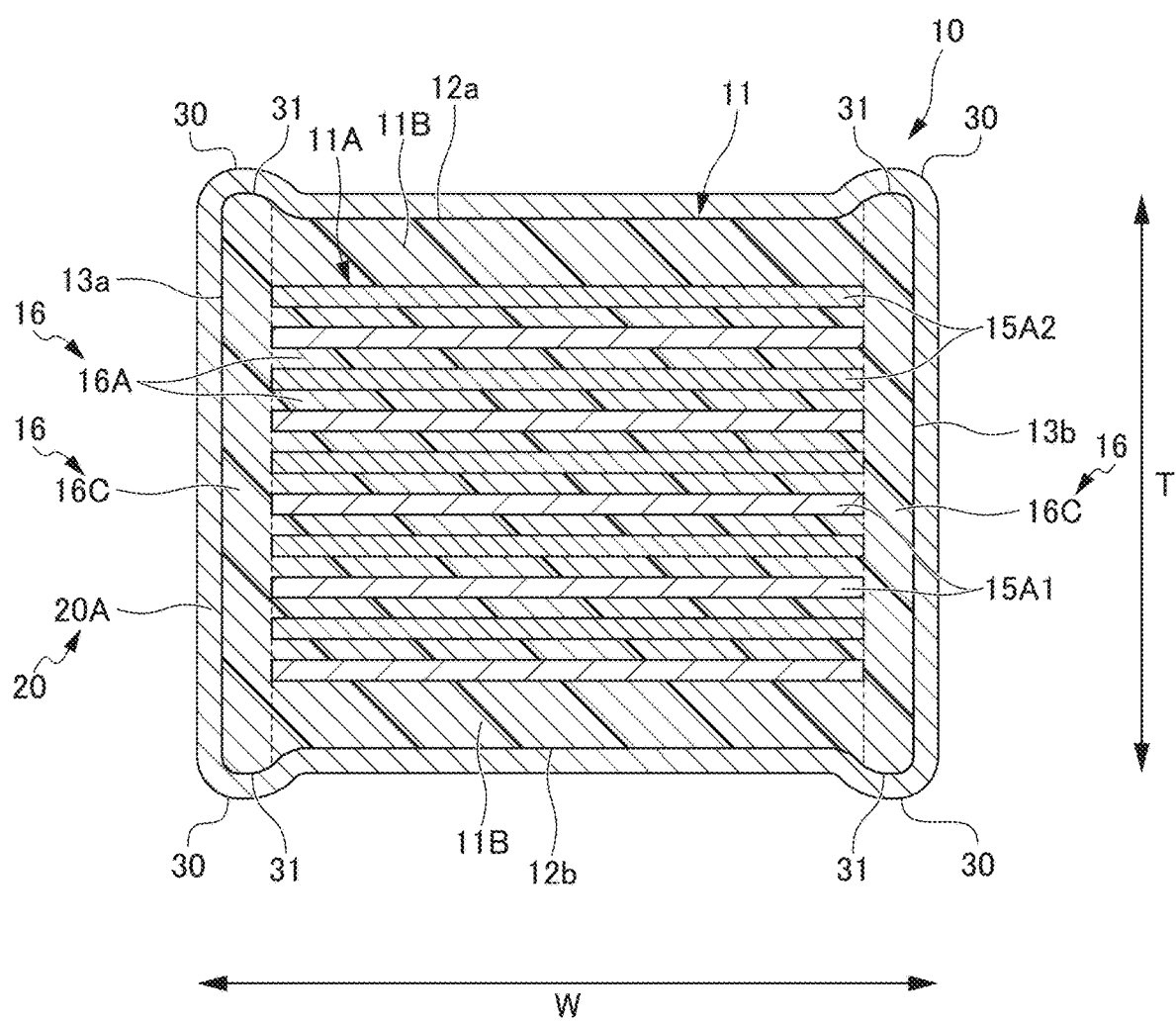
FIG. 3 is a cross-sectional view taken along the line III-III of FIG. 1.
Figure 4:
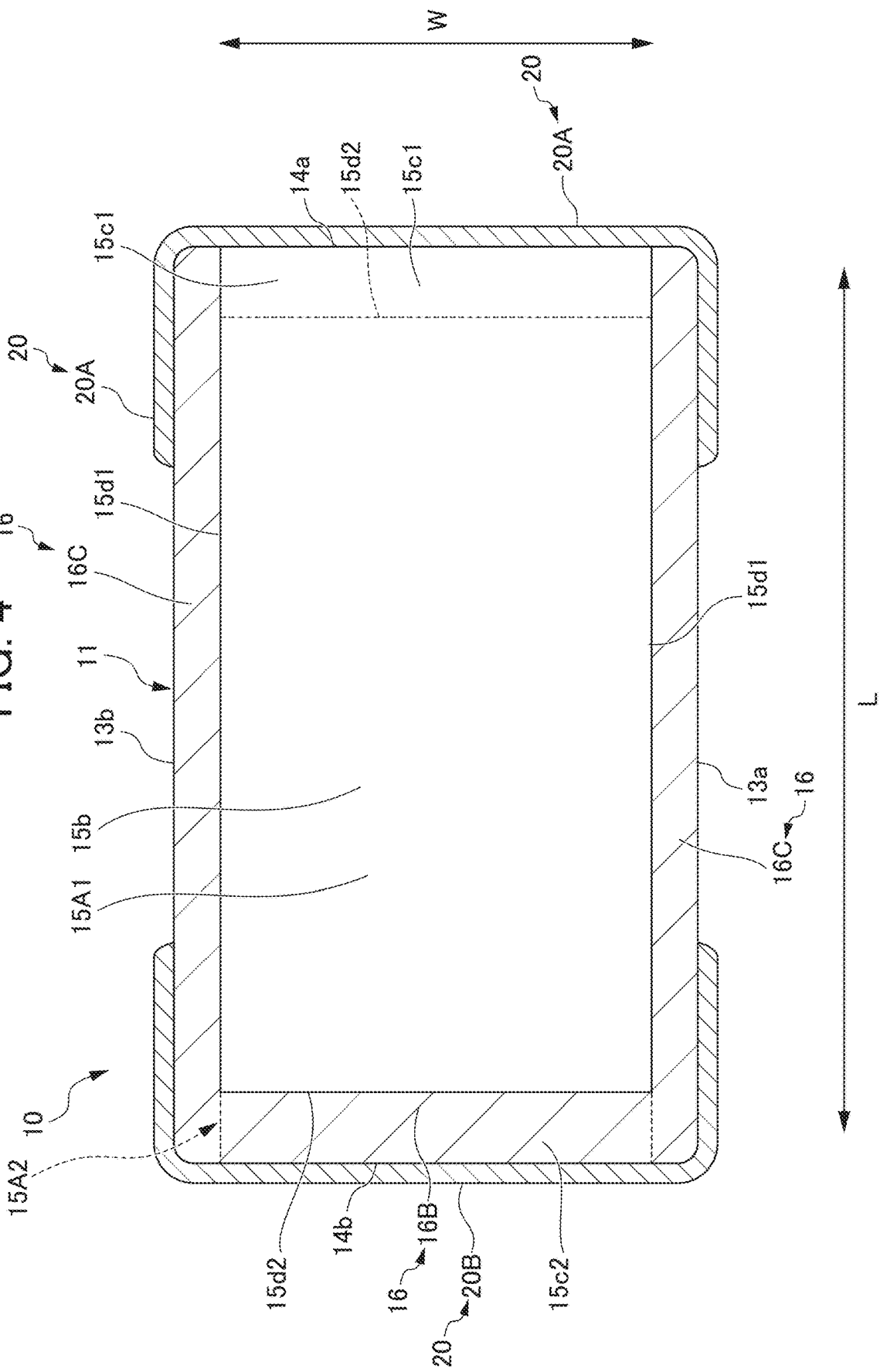
FIG. 4 is a cross-sectional view taken along the line IV-IV of FIG. 2.

FIG. 1 is a schematic perspective view of a multilayer ceramic capacitor 10 according to a first preferred embodiment of the present invention. FIG. 2 is a cross-sectional view taken along the line II-II shown in FIG. 1. FIG. 3 is a cross-sectional view taken along the line III-III shown in FIG. 1. FIG. 4 is a cross-sectional view taken along the line IV-IV shown in FIG. 2.

As shown in FIG. 1, the multilayer ceramic capacitor 10 of the first preferred embodiment has a substantially rectangular parallelepiped shape as a whole. The multilayer ceramic capacitor 10 includes a multilayer body 11 having a substantially rectangular parallelepiped shape and a pair of external electrodes 20.

In each of FIGS. 1 to 3, the arrow T indicates a lamination (stacking) direction of the multilayer ceramic capacitor 10 and the multilayer body 11. In each of FIGS. 1, 2, and 4, the arrow L indicates a length direction orthogonal or substantially orthogonal to the lamination direction T of the multilayer ceramic capacitor 10 and the multilayer body 11. In each of FIGS. 1, 3, and 4, the arrow W indicates a width direction of the multilayer ceramic capacitor 10 and the multilayer body 11 orthogonal or substantially orthogonal to the lamination direction T and the length direction L. FIG. 2 shows a cross section LT. FIG. 3 shows a cross section WT, and FIG. 4 shows a cross section LW.

The multilayer body 11 includes a first main surface 12a and a second main surface 12b opposed to each other in the lamination direction T, a first lateral surface 13a and a second lateral surface 13b opposed to each other in the width direction W, and a first end surface 14a and a second end surface 14b opposed to each other in the length direction L.

As shown in FIGS. 2 to 4, the multilayer body 11 includes a plurality of internal electrode layers 15 and a plurality of dielectric ceramic layers 16 laminated in the lamination direction T.

The plurality of internal electrode layers 15 include a first internal electrode layer 15A1 and a second internal electrode layer 15A2 adjacent to each other in the lamination direction T. The first internal electrode layer 15A1 and the second internal electrode layer 15A2 have substantially the same rectangular shape. Each of the first internal electrode layer 15A1 and the second internal electrode layer 15A2 includes a rectangular counter portion 15b adjacent to each other in the lamination direction T with the dielectric ceramic layer 16 interposed therebetween.

The first internal electrode layer 15A1 includes a first extension portion 15c1 extending from an end portion of the counter portion 15b on the first end surface 14a side toward the first end surface 14a. The tip of the first extension portion 15c1 is exposed at the first end surface 14a. The second internal electrode layer 15A2 includes a second extension portion 15c2 extending from an end portion of the counter portion 15b on the second end surface 14b side to the second end surface 14b. The tip of the second extension portion 15c2 is exposed at the second end surface 14b. Since the first internal electrode layer 15A1 and the second internal electrode layer 15A2 include the same basic structure, the first internal electrode layer 15A1 and the second internal electrode layer 15A2 may be collectively referred to as an internal electrode layer 15 when they do not need to be distinguished from each other.

As shown in FIG. 4, the internal electrode layer 15 preferably includes a pair of first edge portions 15d1 extending in the length direction L at two end portions in the width direction W, and a pair of second edge portions 15d2 extending in the width direction W at both end portions in the length direction L of the counter portion 15b.

The internal electrode layer 15 is a conductive thin film containing metals such as, for example, Ni, Cu, Ag, Pd, Ag—Pd alloy, and Au. The internal electrode layer 15 is not limited to these metal materials, and may be made of other conductive materials. The internal electrode layer 15 may further include dielectric particles having the same composition as the ceramic contained in the dielectric ceramic layer 16.

The dielectric ceramic layer 16 includes a plurality of first dielectric ceramic layers 16A, a plurality of second dielectric ceramic layers 16B, and a pair of third dielectric ceramic layers 16C. Each of the plurality of first dielectric ceramic layers 16A is provided between the first internal electrode layer 15A1 and the second internal electrode layer 15A2 in the lamination direction T. Each of the plurality of second dielectric ceramic layers 16B is provided to fill a region where the internal electrode layer 15 is not provided, between the first dielectric ceramic layers 16A opposed to each other with the internal electrode layer 15 interposed therebetween. Each of the plurality of second dielectric ceramic layers 16B overlaps in the lamination direction T with each of the first dielectric ceramic layers 16A on two sides in the lamination direction T. The pair of third dielectric ceramic layers 16C are provided to sandwich an inner layer portion 11A and an outer layer portion 11B on the main surface side, which will be described later, in the width direction W, and defines an outer layer portion on the lateral surface side, and the respective surfaces thereof provide a first lateral surface 13a and a second lateral surface 13b. Since the first dielectric ceramic layer 16A, the second dielectric ceramic layer 16B, and the third dielectric ceramic layer 16C are made of a material having a common characteristic, they may be collectively referred to as a dielectric ceramic layer 16 when they do not need to be distinguished from each other.

The dielectric ceramic layer 16 is preferably formed, for example, by firing a ceramic material containing barium titanate as a main component. The dielectric ceramic layer 16 may be made of another high dielectric constant ceramic material (for example, including $CaTiO_3$, $SrTiO_3$, $CaZrO_3$, or the like as a main component). The ceramic material of the dielectric ceramic layer 16 includes additives such as, for example, Si, Mg, Mn, Sn, Cu, rare earth, Ni, and Al for the purpose of adjusting the composition.

The multilayer body 11 further includes an inner layer portion 11A and an outer layer portion 11B. In the inner layer portion 11A, the plurality of first internal electrode layers 15A1 and the plurality of second internal electrode layers 15A2 are alternately laminated with the first dielectric ceramic layer 16A interposed therebetween. The inner layer portion 11A generates capacitance and substantially functions as a capacitor. Each of the pair of outer layer portions 11B are provided to sandwich the inner layer portion 11A in the lamination direction, and the respective surfaces thereof define the first main surface 12a and the second main surface 12b. The outer layer portion 11B is made of a dielectric ceramic material the same as or similar to that of the dielectric ceramic layer 16.

As shown in FIGS. 1 and 3, the pair of external electrodes 20 are spaced apart from each other so as to cover the surfaces of both ends in the length direction L of the multilayer body 11. Each of the pair of external electrodes 20 preferably includes a conductive film, for example. The pair of external electrodes 20 includes a first external electrode 20A provided on the first end surface 14a side and a second external electrode 20B provided on the second end surface 14b side.

The tip of the first extension portion 15c1 of each of the first internal electrode layers 15A1 is in contact with the first external electrode 20A. Thus, the first internal electrode layer 15A1 is electrically connected to the first external electrode 20A. The tip of the second extension portion 15c2 of each of the second internal electrode layers 15A2 is in contact with the second external electrode 20B. Thus, the second internal electrode layer 15A2 is electrically connected to the second external electrode 20B. That is, in the inner layer portion 11A, the counter portion 15b of each of the first internal electrode layers 15A1 connected to the first external electrode 20A and the counter portion 15b of each of the second internal electrode layers 15A2 connected to the second external electrode 20B are alternately laminated in the lamination direction T with the first dielectric ceramic layers 16A interposed therebetween. Thus, the capacitor elements are electrically connected in parallel between the first external electrode 20A and the second external electrode 20B. Since the basic structures of the first external electrode 20A and the second external electrode 20B are the same or substantially the same, the first external electrode 20A and the second external electrode 20B may be collectively referred to as an external electrode 20 when there is no need to distinguish them from each other.

The external electrode 20 preferably includes, for example, a laminated film of a sintered metal layer and a plating layer. The sintered metal layer is preferably formed by, for example, firing a paste such as Cu, Ni, Ag, Pd, Ag—Pd alloy, or Au. The plating layer includes, for example, a Ni-plated layer and a Sn-plated layer covering the Ni-plated layer. The plating layer may be, for example, a Cu-plated layer or an Au-plated layer instead. In addition, the external electrode 20 may be made of only a plating layer, and furthermore, a conductive resin paste may be used.

In the multilayer ceramic capacitor 10 of the first preferred embodiment, for example, the multilayer body 11 is preferably formed by, for example, laminating a ceramic material such as a ceramic green sheet defining and functioning as the dielectric ceramic layer 16 and the pair of outer layer portions 11B, and a conductive material such as a conductive paste functioning as the internal electrode layer 15. Thereafter, the multilayer body 11 is fired, and then the external electrodes 20 are preferably formed by, for example, firing, plating, or the like, thus manufacturing the multilayer ceramic capacitor 10. The external electrode 20 may be formed by, for example, firing a portion or all of the external electrode 20 at the same time as firing the multilayer body 11 except for plating.

In the multilayer ceramic capacitor 10 of the first preferred embodiment, as shown in FIG. 1, at each of the four corners of the surface of the multilayer body 11 on the first main surface 12a side, a first protrusion 30 whose surface height is higher than that of the other portions is provided. The first protrusions 30 are similarly provided at four corners of the surface of the second main surface 12b side. Each of the first protrusions 30 of the preferred embodiment projects from a flat surface of the external electrode 20. The four first protrusions 30 have the same or substantially the same height.

As shown in FIGS. 2 and 3, each of the first protrusions 30 is preferably formed by the external electrode 20 covering a first projection 31 provided in the multilayer body 11. The first projection 31 of the multilayer body 11 is preferably provided at four corners of each of the first main surface 12a and the second main surface 12b.

The first projection 31 of the multilayer body 11 can be formed, for example, as a result of the manufacturing process shown in FIGS. 5 to 10. The principle of forming the first projection 31 by the manufacturing process will be described below. FIGS. 5 to 10 each show the manufacturing process of one multilayer body 11 as a model for easy understanding. In practice, a plurality of multilayer body 11 are manufactured collectively. In each of FIGS. 5 to 8 and 10, the upper figure is a plan view, and the lower figure below the plan view is a cross-sectional view corresponding to a cross-sectional line in the upper figure of the plan view. In the following description, the thickness of each of the internal electrode layer 15 and the dielectric ceramic layer 16 is set to "1", and the thickness corresponding to the number of stacked layers is shown. For example, when the number of stacked layers is two, "thickness 1" is set, and when the number of stacked layers is three, "thickness 2" is set. In the plan views of FIG. 5 to FIG. 8 and FIG. 10, the thicknesses of the respective portions partitioned by the lines are denoted by the circled numerals.

As shown in FIG. 5, one dielectric ceramic layer 16 functioning as a base including the first dielectric ceramic layer 16A is formed (thickness 1), and the first internal electrode layer 15A1 is formed thereon (thickness 2). The first extension portion 15c1 of the first internal electrode layer 15A1 is exposed at the first end surface 14a side. Next, as shown in FIG. 6, the second dielectric ceramic layer 16B is formed over the entire or substantially the entire length in the width direction W on the upper surface of the dielectric ceramic layer 16 on the second end surface 14b side where the first internal electrode layer 15A1 is not formed (thickness 2). The dielectric ceramic layer 16 may be formed first, and then the first internal electrode 15A1 may be formed. The dielectric ceramic layer 16 and the internal electrode layer 15 are preferably formed by screen printing, for example. Gravure printing or the like, for example, may also be used. In particular, in screen printing, a printing pattern is formed by using a high-precision screen plate by electroforming or by changing the tension of the screen plate.

Next, as shown in FIG. 7, on the upper surfaces of the dielectric ceramic layer 16 on both sides in the width direction W of the first internal electrode layer 15A1, the dielectric ceramic layers 16 functioning as the third dielectric ceramic layers 16C are laminated over the entire or substantially the entire length in the length direction L to obtain the first material sheet 1A. Since the third dielectric ceramic layer 16C is laminated over the entire or substantially the entire length in the length direction L, the third dielectric ceramic layer 16C overlaps the second dielectric ceramic layer 16B at the corners of both ends in the width direction W on the second end surface 14b side, and only such overlapping portions have three layers, i.e., "thickness 3".

Next, through the same steps as in FIGS. 5 to 7, a second material sheet 1B having the second internal electrode layer 15A2 shown in FIG. 8 is obtained. In the second internal electrode layer 15A2 of the second material sheet 1B, the second extension portion 15c2 is exposed at the second end surface 14b side. In the second material sheet 1B, the third dielectric ceramic layer 16C overlaps the second dielectric ceramic layer 16B at the corners of both ends in the width direction W on the first end surface 14a side, and only such overlapping portions have three layers, i.e., "thickness 3".

Figure 9:
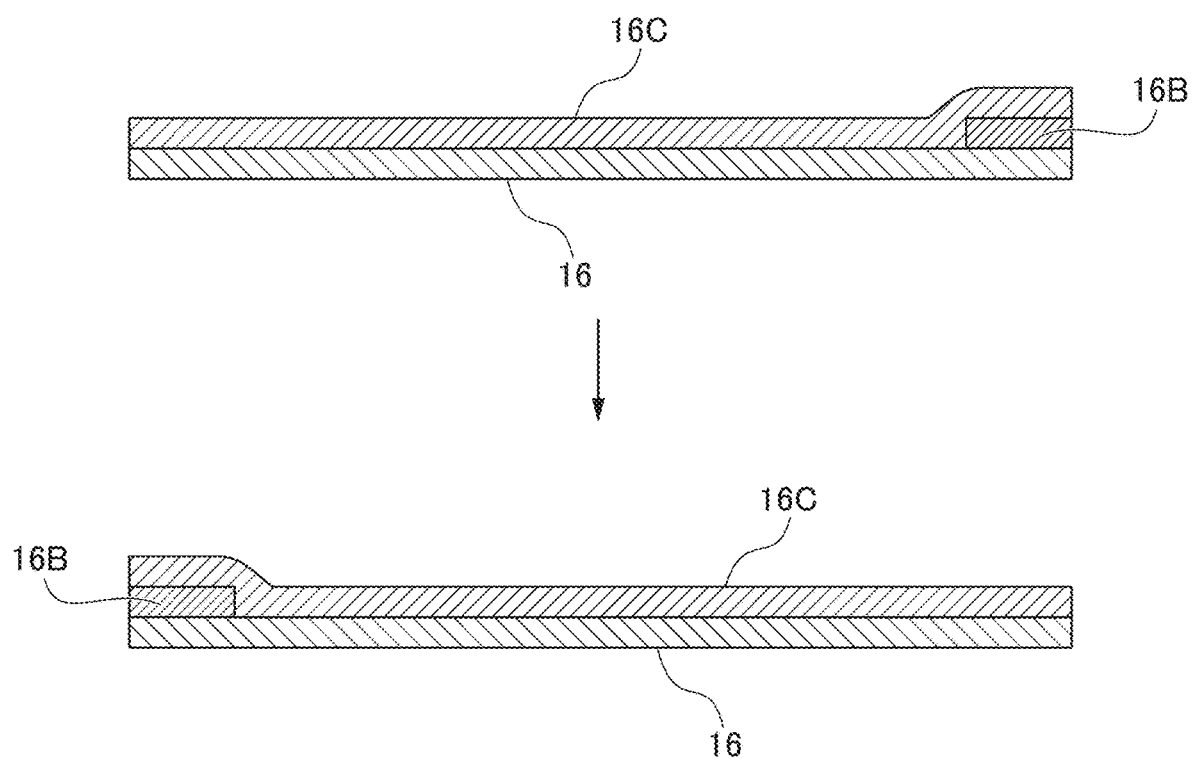
FIG. 9 is a cross-sectional view showing a fifth stage of the manufacturing method.

Next, as shown in FIG. 9, the second material sheet 1B is superimposed on the first material sheet 1A and pressed from both sides in the lamination direction T to obtain a multilayer body model 11M1 shown in FIG. 10. The multilayer body 11 of the first preferred embodiment described above is manufactured by superimposing a large number of first material sheets 1A and second material sheets 17B. However, a structure in which two material sheets 17A and 17B are superimposed is provided here as the multilayer body model 11M1 of the first preferred embodiment similar to the structure of the multilayer body 11. In the multilayer body model 11M1, the corner portions of the "thickness 3" of the first material sheet 1A respectively overlap the portions of "thickness 2" of the second material sheet 1B, and the corner portions of the "thickness 3" of the second material sheet 1B overlap the portion of "thickness 2" of the first material sheet 1A. As a result, "thickness 5" is obtained at the four corners, and "thickness 4" is obtained at the other portions. In FIG. 10, portions corresponding to the first projections 31 in the multilayer body 11 of the first preferred embodiment are denoted by the same reference numerals.

When the above-described multilayer body 11 is manufactured in this manner, the first projections 31 are preferably similarly formed at the four corners of each of the first main surface 12a and the second main surface 12b of the multilayer body 11. When the pair of external electrodes 20 is formed on the multilayer body 11, the first protrusions 30 are formed. The first protrusions preferably have the same or substantially the same shape.

The multilayer ceramic capacitor 10 is used by being mounted on a board of a predetermined device. In such a case, one of the first main surface 12a and the second main surface 12B may be placed on the board in a manner opposed to the surface of the board, following which a mounting operation such as soldering may be performed. When one of the first main surface 12a and the second main surface 12b is opposed to the surface of the board, the first protrusions 30 at the four corners are in a state of standing on the board, resulting in the placement on the board in a stable posture. As a result, the mounting operation can be smoothly performed.

The multilayer ceramic capacitor 10 according to the first preferred embodiment of the present invention includes the rectangular or substantially rectangular parallelepiped multilayer body 11 including the plurality of dielectric ceramic layers 16 and the plurality of internal electrode layers 15 laminated alternately in the lamination direction T, the multilayer body 11 further including the first main surface 12a and the second main surface 12b opposed to each other in the lamination direction T, the first lateral surface 13a and the second lateral surface 13b opposed to each other in the width direction W orthogonal or substantially orthogonal to the lamination direction T, and the first end surface 14a and the second end surface 14b opposed to each other in the length direction L orthogonal or substantially orthogonal to the lamination direction T and the width direction W, and the pair of external electrodes 20 that are provided at both ends of the multilayer body 11 in the length direction L to cover at least the first end surface 14a and the second end surface 14b, and connected to the internal electrode layers 15, in which the first protrusion 30 is provided at each of the four corners on a surface of at least one selected from the first main surface 12a and the second main surface 12b having a substantially rectangular shape.

With such a configuration, when the multilayer ceramic capacitor 10 is mounted on the board, the first protrusions 30 at the four corners of the first main surface 12a or the second main surface 12b are mounted on the board, such that it is possible to maintain a stable posture at the time of mounting. For example, if the thickness in the lamination direction T at the center in the length direction L is the largest, the multilayer ceramic capacitor tends to swing when the multilayer ceramic capacitor is mounted on the board, and the posture is not stable. However, according to the multilayer ceramic capacitor 10 of the first preferred embodiment, when the multilayer ceramic capacitor 10 is mounted on the board using the first protrusions 30 at the four corners, the posture of the multilayer ceramic capacitor 10 is stabilized.

Second Preferred Embodiment

Next, a second preferred embodiment of the present invention will be described with reference to FIGS. 11 to 20. Although the basic configuration of the second preferred embodiment is the same or substantially the same as that of the first preferred embodiment, the shape of a specific component is partially different from that of the first preferred embodiment. Therefore, the same or corresponding components as those in the first preferred embodiment are denoted by the same reference numerals, and the description thereof will be omitted or simplified.

Figure 11:
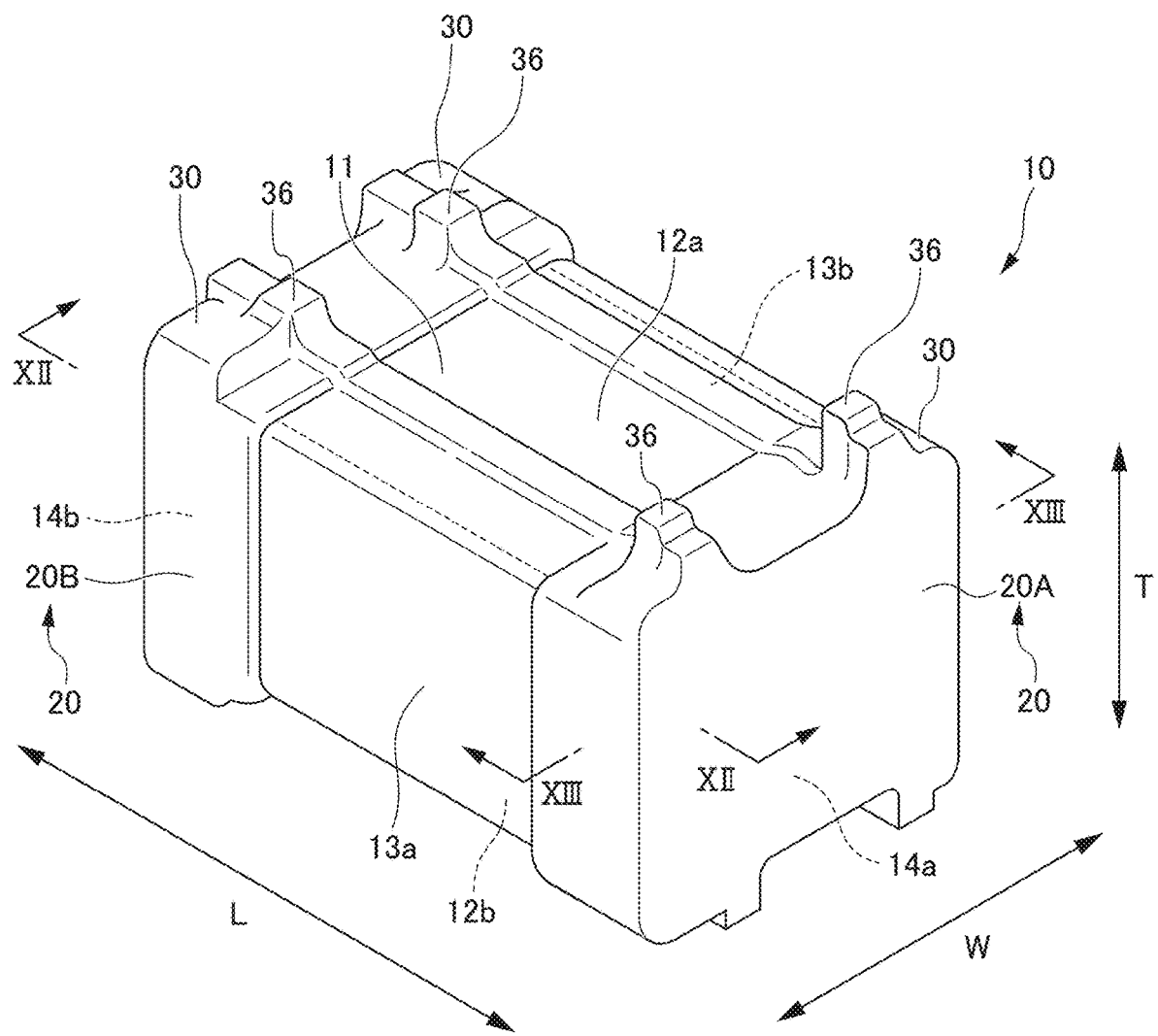
FIG. 11 is an external perspective view of a multilayer ceramic capacitor according to a second preferred embodiment of the present invention.
Figure 12:
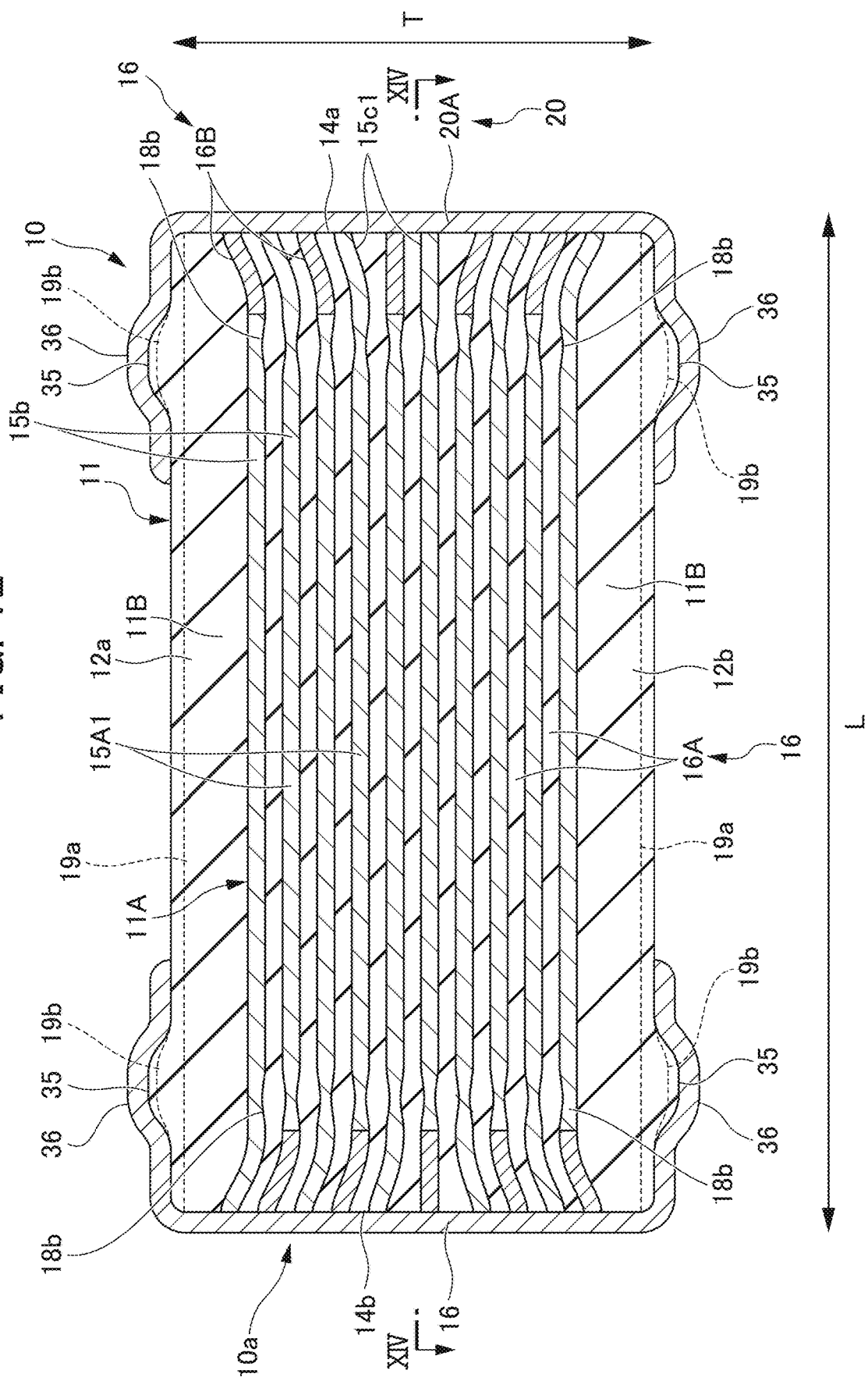
FIG. 12 is a cross-sectional view taken along the line XII-XII of FIG. 11.
Figure 13:
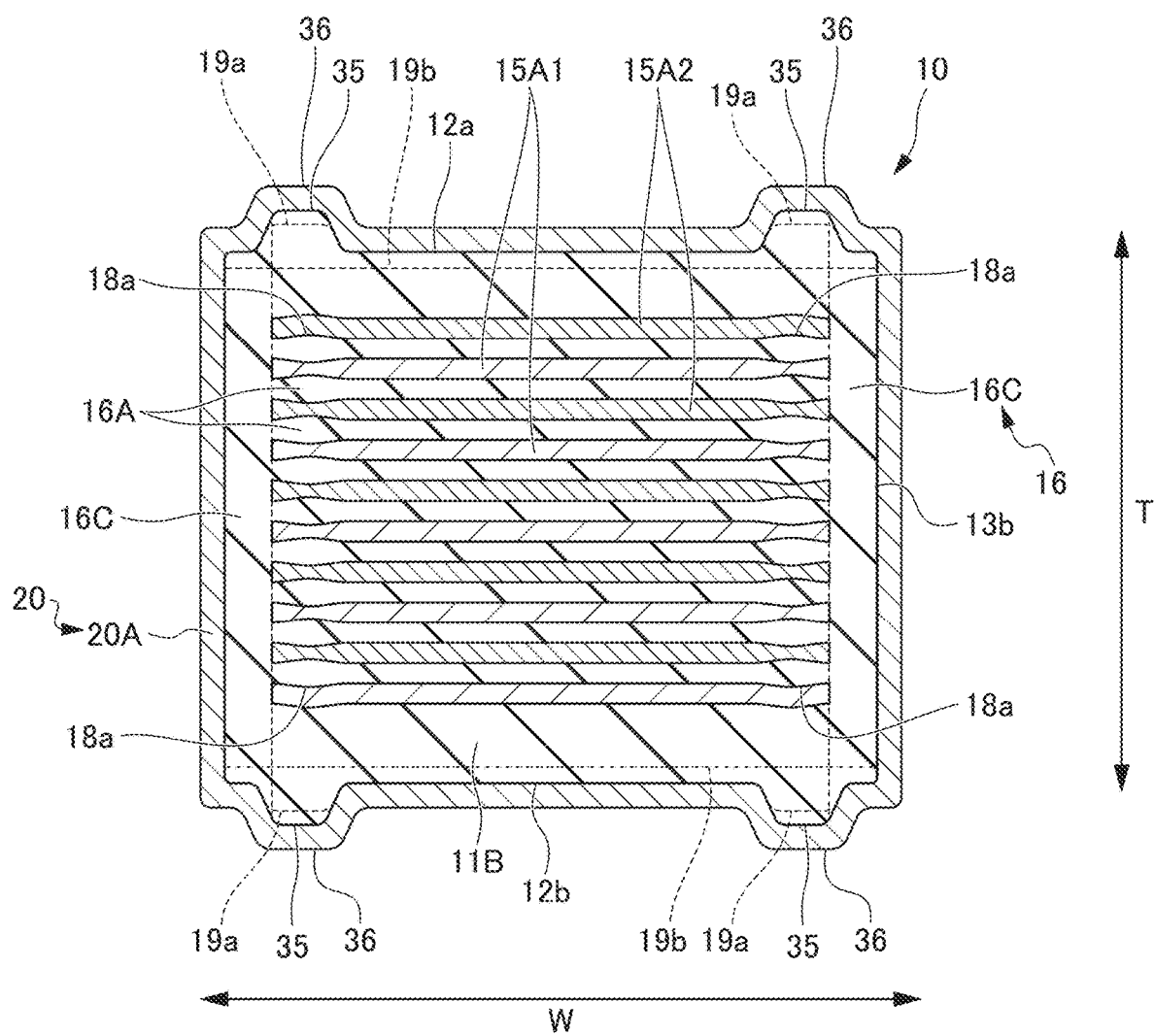
FIG. 13 is a cross-sectional view taken along the line XIII-XIII of FIG. 11.
Figure 14:
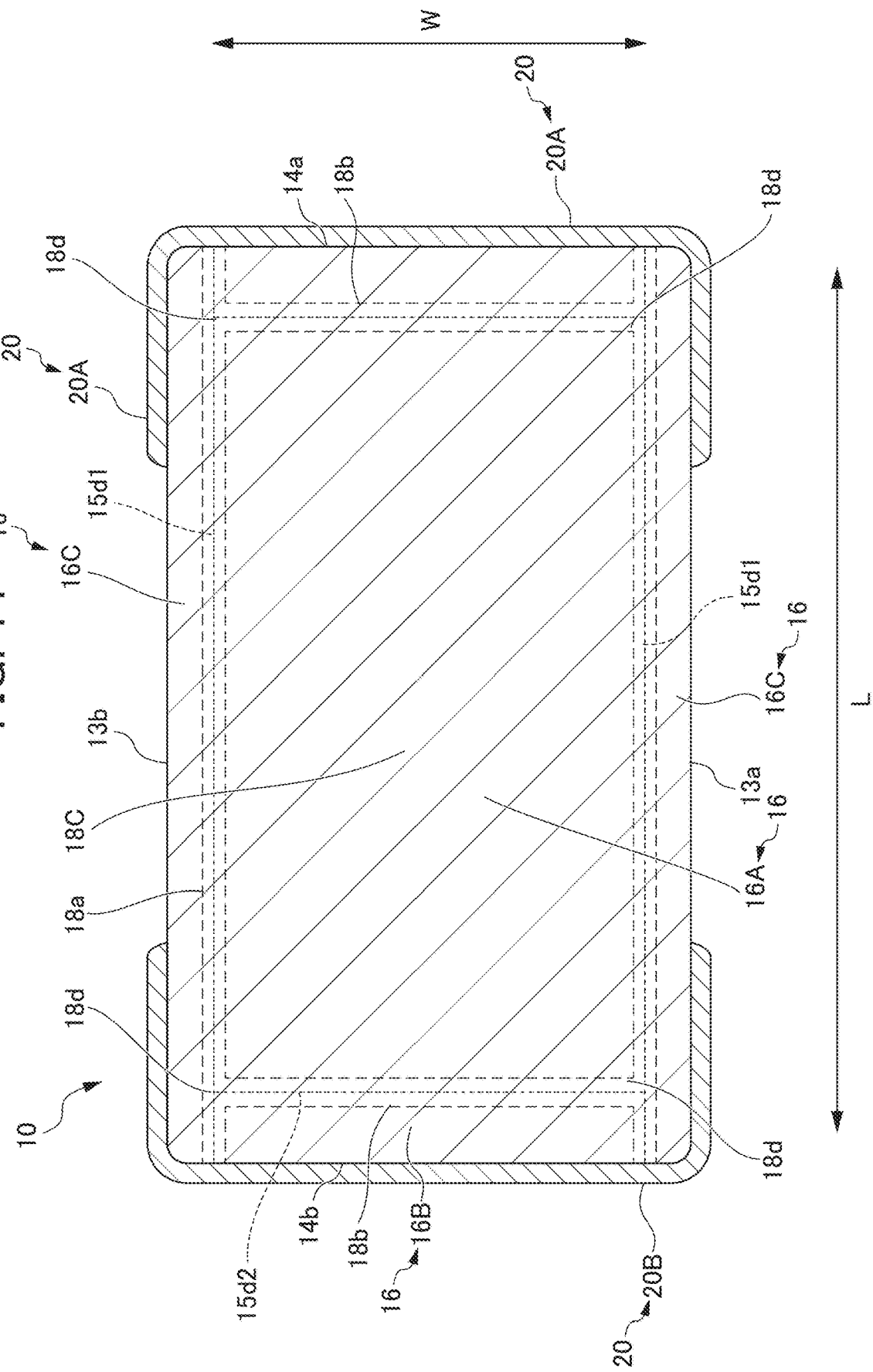
FIG. 14 is a cross-sectional view taken along the line XIV-XIV of FIG. 12.

FIG. 11 is a schematic perspective view of a multilayer ceramic capacitor 10 according to a second preferred embodiment of the present invention. FIG. 12 is a cross-sectional view taken along the line XII-XII shown in FIG. 11. FIG. 13 is a cross-sectional view taken along the line XIII-XIII shown in FIG. 11. FIG. 14 is a cross-sectional view taken along the line XIV-XIV shown in FIG. 12.

In the multilayer ceramic capacitor 10 of the second preferred embodiment, as shown in FIGS. 12 to 14, a dielectric ceramic layer 16 includes a pair of first peripheral portions 18a and a pair of second peripheral portions 18b.

The first peripheral portions 18a are each a portion between a first edge portion 15d1 of a first internal electrode layer 15A1 and a first edge portion 15d1 of a second internal electrode layer 15A2 which are adjacent to each other and opposed to each other in the lamination direction T. The first peripheral portions 18a each extend in the length direction L. The second peripheral portions 18b are each a portion between a second edge portion 15d2 of the first internal electrode layer 15A1 and a second edge portion 15d2 of the second internal electrode layer 15A2 which are adjacent to each other and opposed to each other in the lamination direction T. The second peripheral portions 18b each extend in the width direction W. The dielectric ceramic layer 16 includes a rectangular central region 18c surrounded by the first peripheral portion 18a and the second peripheral portion 18b. Furthermore, the dielectric ceramic layer 16 includes four intersections 18d where the first peripheral portion 18a and the second peripheral portion 18b intersect with each other.

The central region 18c of the dielectric ceramic layer 16 is generally a region of the first dielectric ceramic layer 16A. The thicknesses of the first peripheral portion 18a and the second peripheral portion 18b are greater than the thickness of the central region 18c. The thickness of the first peripheral portion 18a and the thickness of the second peripheral portion 18b are the same or substantially the same. Furthermore, the thickness of the dielectric ceramic layer 16 at each of the intersections 18d is even larger than the thicknesses of the first peripheral portion 18a and the second peripheral portion 18b.

For example, when the multilayer body 11 is finally press-molded, particularly the first edge portion 15d1 and the second edge portion 15d2 of the internal electrode layer 15 are likely to deform, and there is a possibility that the internal electrode layers 15 adjacent to each other in the lamination direction T in the portion are brought into contact with each other and short-circuited. Therefore, as in the second preferred embodiment, by making the first peripheral portion 18a and the second peripheral portion 18b of the dielectric ceramic layer 16 thicker than the central region 18c, it becomes difficult for the first internal electrode layer 15A1 and the second internal electrode layer 15A2 adjacent to each other in the lamination direction T to contact each other, and a short circuit is prevented.

Furthermore, the corner portions of the four corners of the internal electrode layer 15 are more likely to deform than the first edge portion 15d1 and the second edge portion 15d2 at the time of press molding, and short circuit is more likely to occur. However, as in the second preferred embodiment, by making the thickness of each of the intersections 18d of the dielectric ceramic layer 16 corresponding to the corner portions of the internal electrode layer 15 larger than the thickness of the first peripheral portion 18a and the second peripheral portion 18b, the contact between the internal electrode layers 15 adjacent to each other in the lamination direction T can be further reduced or prevented, and short circuit can be further prevented.

As shown in FIGS. 11 to 13, the first main surface 12a of the multilayer body 11 includes a pair of first linear projections 19a extending in the length direction L, and the second main surface 12b includes a pair of second linear projections 19b extending in the width direction W. The pair of first linear projections 19a are preferably formed by, for example, laminating a plurality of first peripheral portions 18a so that the dielectric ceramic layer 16 bulges on the first main surface 12a. The pair of second linear projections 19b are formed by laminating a plurality of second peripheral portions 18b so that the dielectric ceramic layer 16 bulges on the second main surface 12b.

Furthermore, each of the first main surface 12a and the second main surface 12b of the multilayer body 11 includes four second projections 35. The four second projections 35 are formed by stacking the intersections 18d of the dielectric ceramic layers 16 so that the intersections 18d bulge on the first main surface 12a and the second main surface 12b, respectively. Since the intersection 18d is thicker than the first peripheral portion 18a and the second peripheral portion 18b, the height of the second projection 35 is higher than the height of the first linear projection 19a and the second linear projection 19b.

In the multilayer ceramic capacitor 10 of the second preferred embodiment, four second protrusions 36 are provided in addition to the four first protrusions 30 of the first preferred embodiment on each of the surface of the external electrode 20 on the first main surface 12a side and the surface of the external electrode 20 on the second main surface 12b side. Each of the second protrusions added in the second preferred embodiment is adjacent to the first protrusion 30 formed at the four corners, and is provided inside the first protrusion 30, that is, at a position toward the center of the first main surface 12a and the second main surface 12b. Accordingly, the second protrusions 36 are also provided at four corners of the first main surface 12a and the second main surface 12b.

Each of the second protrusions 36 of the second preferred embodiment is formed in a portion corresponding to the four second projections 35 in the lamination direction T. The four second protrusions 36 are formed by the external electrode 20 covering each of the second projections 35. The heights of the four second protrusions 36 are the same or substantially the same, and are higher than the heights of the first protrusions 30. Therefore, the height of the second protrusion 36 is the highest on each of the surface on the first main surface 12a side and the surface on the second main surface 12b side.

The second projection 35 of the multilayer body 11 can be formed, for example, as a result of the manufacturing process shown in FIGS. 15 to 20. The principle of forming the second projection 35 by the manufacturing process will be described below. FIGS. 15 to 20 each show the manufacturing process of one multilayer body 11 as a model for easy understanding. In practice, a plurality of multilayer bodies 11 are manufactured collectively. In each of FIGS. 15 to 18 and 20, the upper figure is a plan view, and the lower figure below the plan view is a cross-sectional view corresponding to a cross-sectional line in the upper figure of the plan view. In the following description, the thickness of each of the internal electrode layer 15 and the dielectric ceramic layer 16 is set to "1", and the thickness corresponding to the number of stacked layers is shown. For example, it is "thickness 1" when the number of stacked layers is two, and it is "thickness 2" when the number of stacked layers is three. In the plan views of FIG. 15 to FIG. 18 and FIG. 20, the thicknesses of the respective portions partitioned by the lines are denoted by the circled numerals.

As shown in FIG. 15, one dielectric ceramic layer 16 functioning as a base including the first dielectric ceramic layer 16A is formed (thickness 1), and the first internal electrode layer 15A1 is formed thereon (thickness 2). The first extension portion 15c1 of the first internal electrode layer 15A1 is exposed at the first end surface 14a side. Next, as shown in FIG. 16, the second dielectric ceramic layer 16B is formed over the entire or substantially the entire length in the width direction W on the upper surface of the dielectric ceramic layer 16 on the second end surface 14b side where the first internal electrode layer 15A1 is not formed (thickness 2). At this time, a material such as a ceramic paste forming the second dielectric ceramic layer 16B is overlapped with the second edge portion 15d2 of the first internal electrode layer 15A1 with a predetermined width. The overlapped portion 16f of the second edge portion 15d2 becomes the second peripheral portion 18b described above. Since the material is applied on the second edge portion 15d2 so as to overlap with the second edge portion 15d2, the overlapped portion 16f has "thickness 3".

Next, as shown in FIG. 17, on the upper surfaces of the dielectric ceramic layer 16 on both sides in the width direction W of the first internal electrode layer 15A1, the third dielectric ceramic layers 16C are laminated over the entire or substantially the entire length in the length direction L to obtain the first material sheet 2A according to the second embodiment. At this time, a material such as a ceramic paste forming the third dielectric ceramic layer 16C is overlapped with the first edge portion 15d1 of the first internal electrode layer 15A1 with a predetermined width. The overlapped portion 16g of the first edge portion 15d1 becomes the first peripheral portion 18a described above. Since the material is applied on the first edge portion 15d1 so as to overlap with the first edge portion 15d1, the overlapped portion 16g has "thickness 3". Furthermore, since the third dielectric ceramic layer 16C covers the second dielectric ceramic layer 16B at both end portions in the width direction W of the overlapped portion 16f having the "thickness 3", the double overlapped portions 16h having "thickness 4" are formed.

Figure 18:
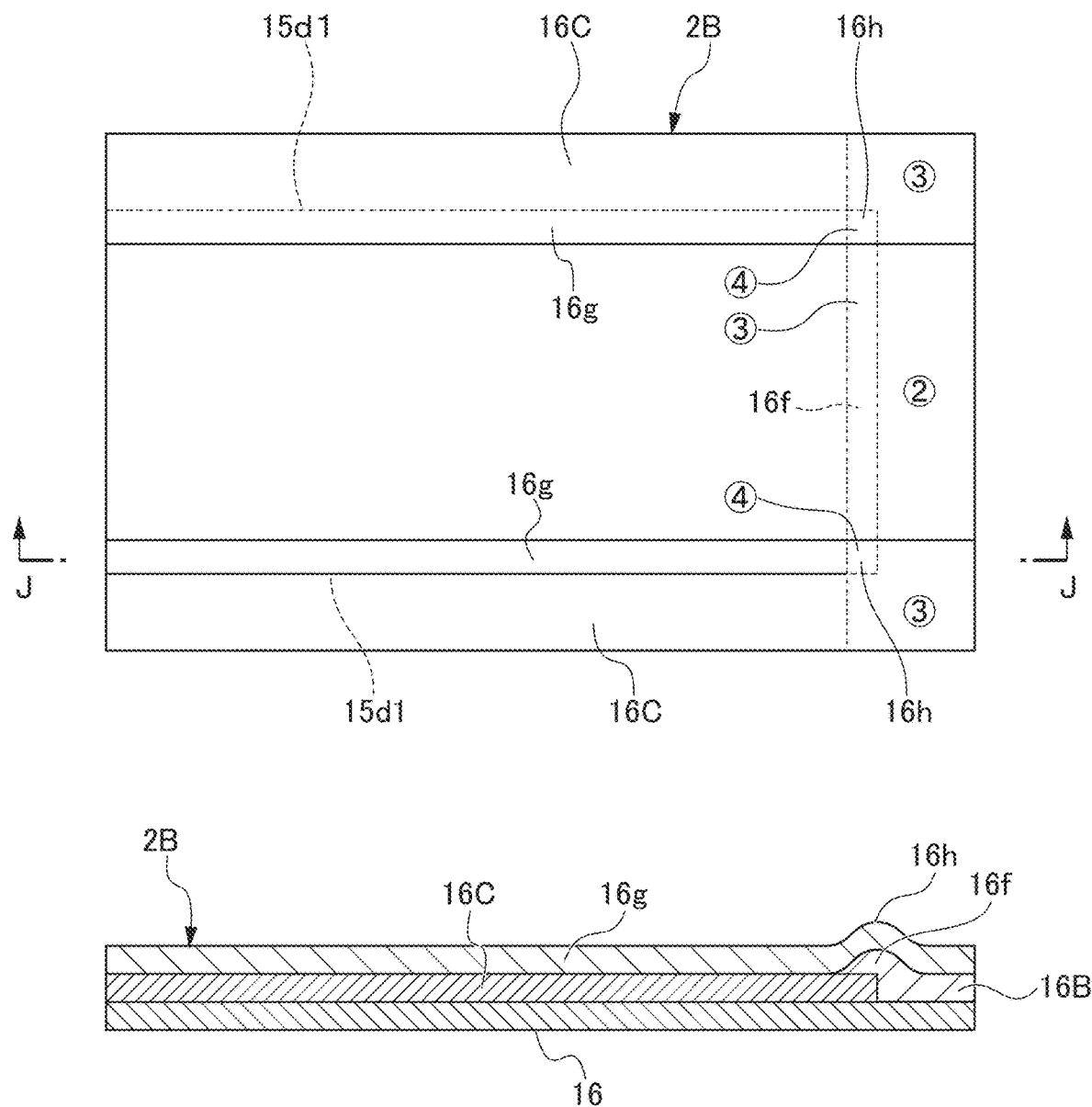
FIG. 18 is a view schematically showing a fourth stage of the manufacturing method, in which the upper figure is a plan view and the lower figure is a cross-sectional view taken along the line J-J in the plan view of the upper figure.

Next, through the same steps as in FIGS. 15 to 17, the second material sheet 2B according to the second preferred embodiment including the second internal electrode layer 15A2 shown in FIG. 18 is obtained. In the second internal electrode layer 15A2 of the second material sheet 2B, the second extension portion 15c2 is exposed at the second end surface 14b side. In the second material sheet 2B, the double overlapped portions 16h having "thickness 4" which are covered by the third dielectric ceramic layer 16C on the second dielectric ceramic layer 16B are formed at both end portions in the width direction W of the overlapped portion 16f on the first end surface 14a side. Thus, the double overlapped portions 16h having "thickness 4" are formed at four positions, and these double overlapped portions 16h become the intersections 18d described above.

Each of the first material sheet 2A shown in FIG. 17 and the second material sheet 2B shown in FIG. 18 has three kinds of thickness portions of "thickness 2", "thickness 3" and "thickness 4" as indicated by the number of thicknesses.

Figure 19:
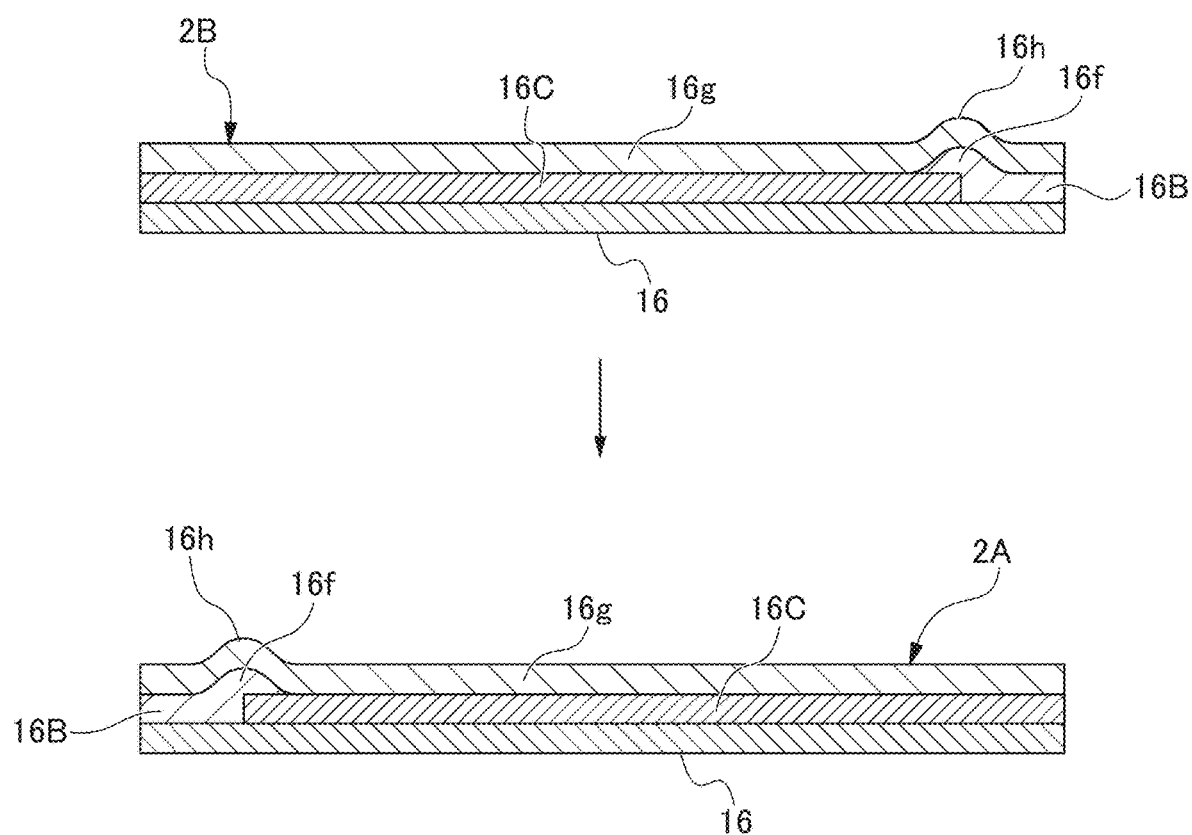
FIG. 19 is a cross-sectional view showing a fifth stage of the manufacturing method.
Figure 20:
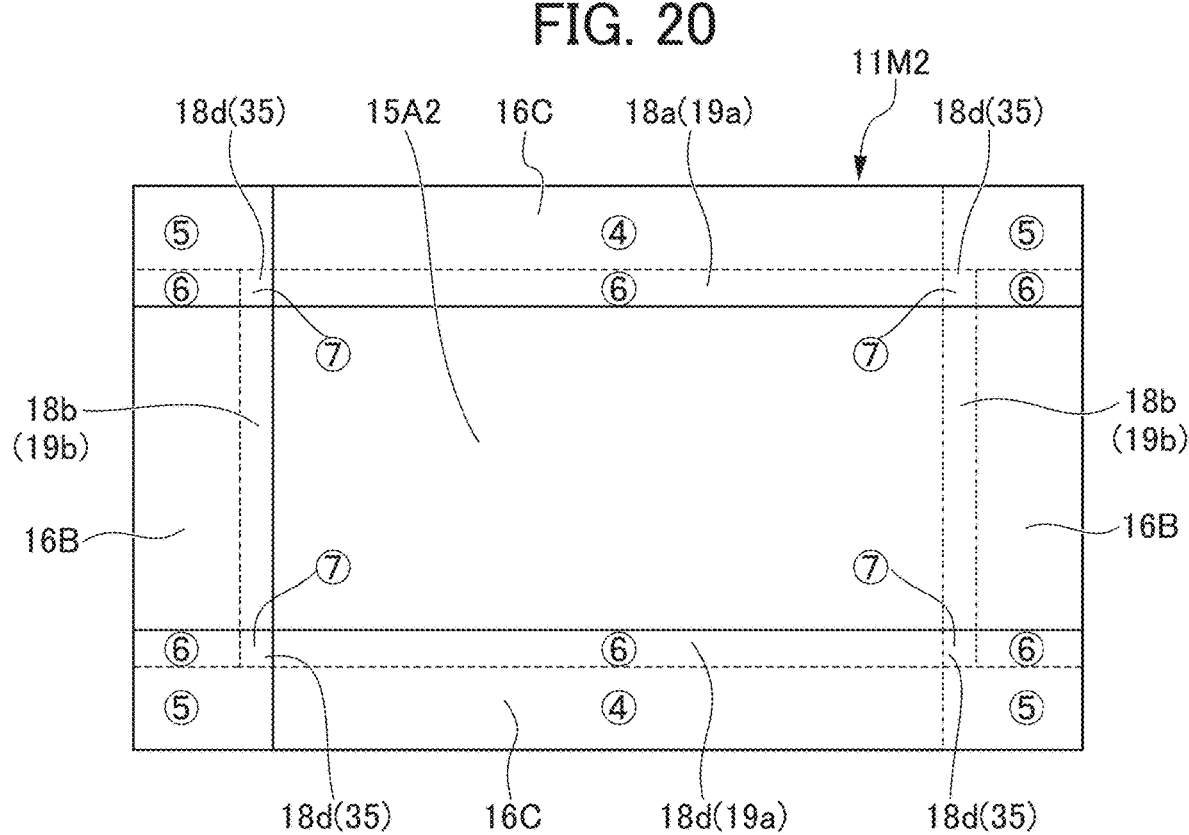
FIG. 20 is a plan view showing the multilayer body model according to the second preferred embodiment of the present invention obtained by the above manufacturing method.

Next, as shown in FIG. 19, the second material sheet 2B is superimposed on the first material sheet 2A and pressed from both sides in the thickness direction to obtain a multilayer body model 11M2 according to the second preferred embodiment shown in FIG. 20.

As shown in FIG. 20, the multilayer body model M2 of the second preferred embodiment includes the four kinds of thickness portions of "thickness 4", "thickness 5", "thickness 6" and "thickness 7". In FIG. 20, portions corresponding to the first peripheral portion 18a and the first linear projection 19a formed by stacking the first peripheral portion 18a, the second peripheral portion 18b and the second linear projection 19b formed by stacking the second peripheral portion 18b, and the intersection 18d and the second projection 35 formed by stacking the intersection 18d in the multilayer body 11 of the second preferred embodiment are denoted by the same reference numerals.

A portion corresponding to the first peripheral portion 18a and the first linear projection 19a formed by stacking the first peripheral portion 18a is "thickness 6". This is because the three layers of the base dielectric ceramic layer 16 of the first material sheet 2A and the second material sheet 2B, the internal electrode layer 15, and the overlapped portion 16f of the third dielectric ceramic layer 16C doubly overlap, thereby forming six layers.

A portion corresponding to the second peripheral portion 18b and the second linear projection 19b formed by stacking the second peripheral portion 18b has "thickness 5". This is because the two layers of the base dielectric ceramic layer 16 of the second material sheet 2B and the internal electrode layer 15 are laminated on the three layers of the base dielectric ceramic layer 16 of the first material sheet 2A, the internal electrode layer 15, and the overlapped portion 16f of the third dielectric ceramic layer 16C to form five layers.

A portion corresponding to the intersection 18d and the second projection 35 formed by stacking the intersection 18d is "thickness 7". This is because the three layers of the base dielectric ceramic layer 16 of the second material sheet 2B, the internal electrode layer 15, and the overlapped portion 16f of the second dielectric ceramic layer 16B of the second edge portion 15d2 are laminated on the four layers of the base dielectric ceramic layer 16 of the first material sheet 2A, the internal electrode layer 15, the overlapped portion 16f of the third dielectric ceramic layer 16C of the first edge portion 15d1, and the overlapped portion 16f of the second dielectric ceramic layer 16B of the second edge portion 15d2 to form seven layers.

When the multilayer body 11 of the second preferred embodiment is manufactured in this manner, the second projections 35 are similarly formed at the four corners of each of the first main surface 12a and the second main surface 12b of the multilayer body 11. When the pair of external electrodes 20 is formed on the multilayer body 11, the second protrusion 36 is formed.

According to the multilayer ceramic capacitor 10 of the second preferred embodiment, since the multilayer ceramic capacitor 10 is placed on the board by employing the second protrusions 36 at the four corners on one of the first main surface 12a and the second main surface 12b, it is difficult to swing on the board and can be mounted in a stable posture.

In the multilayer ceramic capacitor 10 according to the second preferred embodiment, the plurality of internal electrode layers 15 preferably include the first internal electrode layers 15A1 and the second internal electrode layers 15A2 adjacent to each other in the lamination direction T, each of the first internal electrode layers 15A1 and the second internal electrode layers 15A2 includes the counter portion 15b opposed to each other in the lamination direction T with the dielectric ceramic layer 16 interposed therebetween, the first internal electrode layer 15A1 includes the first extension portion 15c1 that extends from an end of the counter portion 15b on the first end surface 14a side toward the first end surface 14a, the second internal electrode layer 15A2 includes the second extension portion 15c2 that extends from an end of the counter portion 15b on the second end surface 14b side toward the second end surface 14b, the pair of external electrodes 20 include the first external electrode 20A that is provided on the first end surface 14a side and connected to the first extension portion 15c1, and the second external electrode 20 that is provided on the second end surface 14b side and connected to the second extension portion 15c2, the dielectric ceramic layers 16 include the plurality of first dielectric ceramic layers 16A each provided between the first internal electrode layer 15A1 and the second internal electrode layer 15A2, the second dielectric ceramic layer 16B that is provided at a region where the internal electrode layer 15 is not provided, between the first dielectric ceramic layers 16A opposed to each other with the internal electrode layer 15 interposed therebetween and overlaps in the lamination direction T with the first dielectric ceramic layer 16A, and the third dielectric ceramic layer 16C provided at each of the first lateral surface 13a and the second lateral surface 13b of the multilayer body 11, the multilayer body 11 includes the inner layer portion 11A in which the first internal electrode layers 15A1 and the second internal electrode layers 15A2 are laminated alternately with the dielectric ceramic layer 16 interposed therebetween, and the pair of outer layer portions 11B made of a ceramic material that sandwich the inner layer portion 11A in the lamination direction T, the internal electrode layers 15 include the pair of first edge portions 15d1 extending in the length direction L at both ends in the width direction W, and the pair of second edge portions 15d2 extending in the width direction W at both ends of the counter portion 15b in the length direction L, the dielectric ceramic layers 16 include the first peripheral portion 18a between the pair of first edge portions 15d1 opposed to each other in the lamination direction T, the second peripheral portion 18b between the pair of second edge portions 15d2 opposed to each other in the lamination direction T, and the central region 18c surrounded by the first peripheral portion 18a and the second peripheral portion 18b, and the first peripheral portion 18a and the second peripheral portion 18b are thicker than the central region 18c.

With such a configuration, the contact between the internal electrode layers 15 at the first edge portion 15d1 and the second edge portion 15d2 can be reduced or prevented, and short circuit can be effectively prevented.

In the multilayer ceramic capacitor 10 according to the second preferred embodiment, the dielectric ceramic layers 16 each include the intersections 18d where the first peripheral portion 18a and the second peripheral portion 18b intersect with each other, the dielectric ceramic layers 16 at the intersections 18d are thicker than the first peripheral portion 18a and the second peripheral portion 18b, and the second protrusions 36 are provided at portions corresponding to the intersections 18d in the lamination direction T on at least one selected from the first main surface 12a and the second main surface 12b.

With such a configuration, short circuit of the internal electrode layer 15 can be further prevented.

Modified Example

Figure 21:
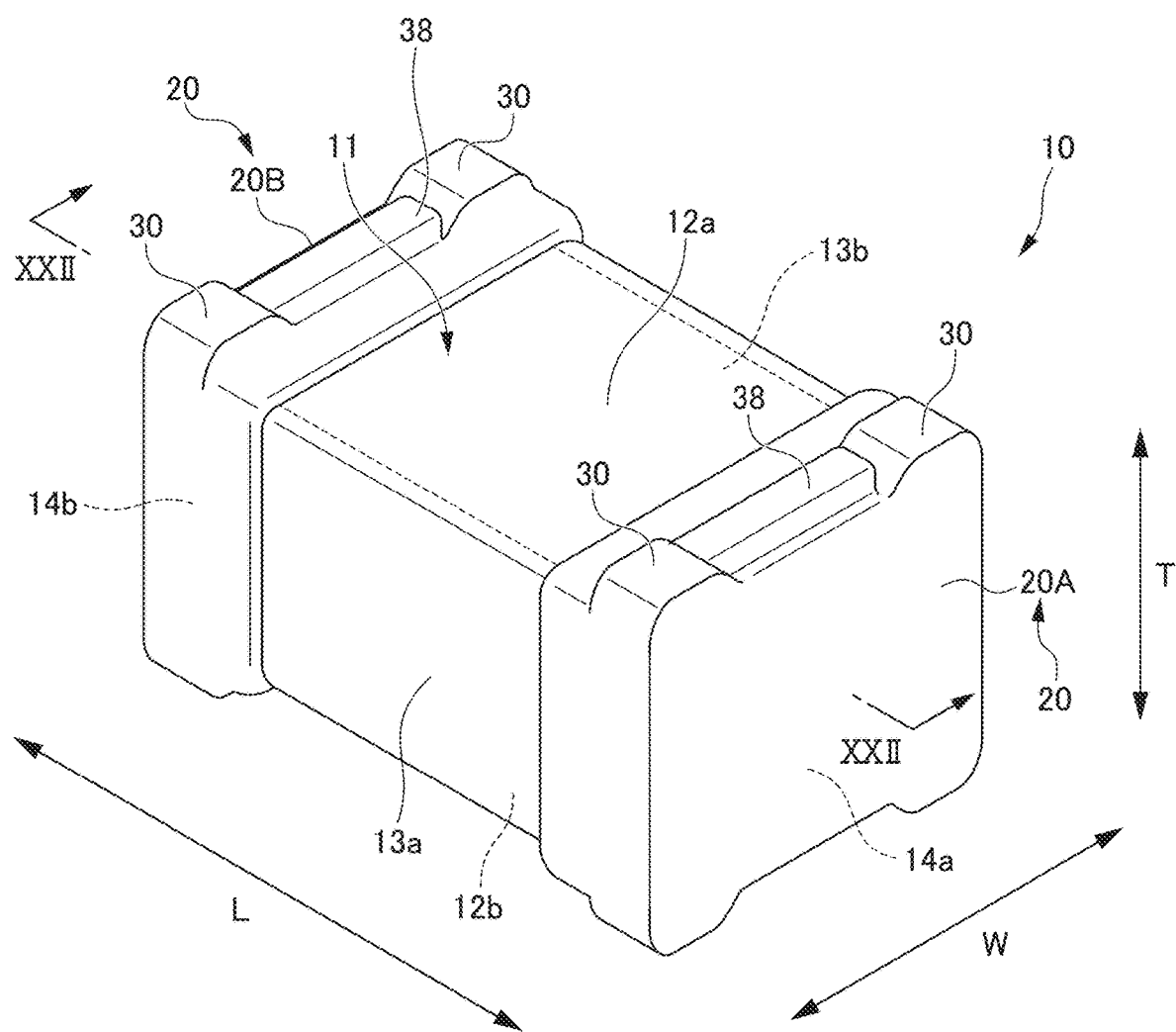
FIG. 21 is a side cross-sectional view of a multilayer body model according to a modified example of the first preferred embodiment of the present invention.
Figure 22:
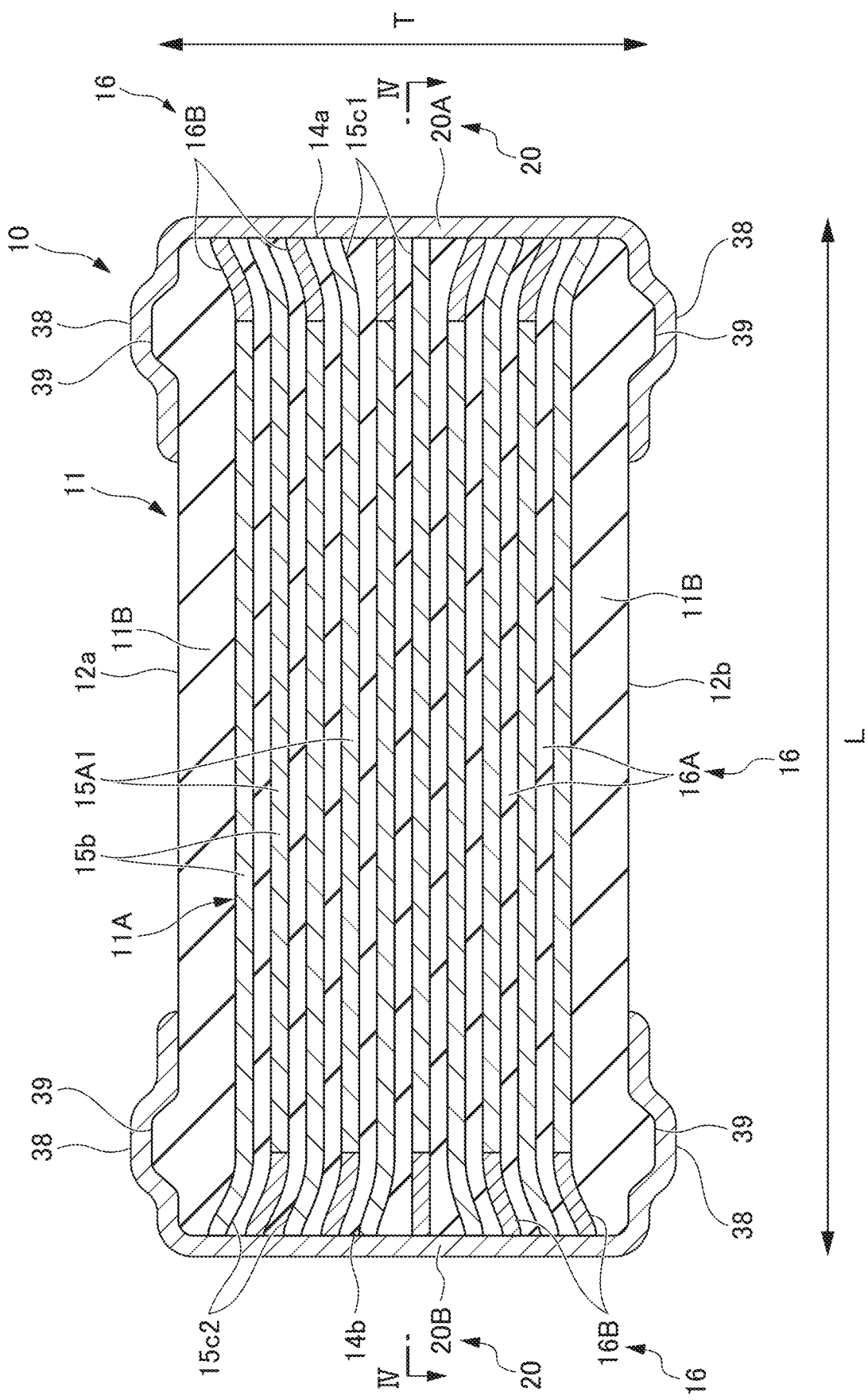
FIG. 22 is a cross-sectional view taken along the line XXII-XXII of FIG. 21.

FIGS. 21 and 22 each show a modified example of the first preferred embodiment. FIG. 21 is a schematic perspective view of a multilayer ceramic capacitor 10 according to the modified Example, and FIG. 22 is a cross-sectional view taken along the line XXII-XXII of FIG. 21.

In this modified example, as shown in FIG. 22, a multilayer body 11 includes raised portions 39 that rise in the lamination direction T and extend in the width direction W at both end portions in the length direction L of the first main surface 12a and the second main surface 12b. The first external electrode 20A and the second external electrode 20B that respectively cover the first end surface 14a and the second end surface 14b at both end portions in the length direction L where the raised portion 39 is formed cover the raised portion 39. With such a configuration, bulging portions 38 extending in the width direction W are also formed on the first main surface 12a side of the first external electrode 20A and the second main surface 12b side of the second external electrode 20B.

With such a configuration, even if moisture penetrates into the boundary portion between the multilayer body 11 and the external electrode 20, the moisture is blocked by the raised portion 39, and the contact with the internal electrode layer 15 exposed at the first end surface 14a and the second end surface 14b is reduced or prevented. In addition, since the raised portion 39 is provided, the distance between the boundary portion between the multilayer body 11 and the external electrode 20 and the interface between the first end surface 14a and the second end surface 14b increases, such that moisture penetration can also be reduced or prevented.

The present invention is not limited to the configuration of the above-described preferred embodiments, and can be appropriately modified and applied without departing from the gist of the present invention. For example, although the first protrusion 30 and the second protrusion 36 may be formed on both the first main surface 12a and the second main surface 12b, they may be formed on only one side of these main surfaces. In this case, the main surface on the side where the first protrusion 30 or the second protrusion 36 is formed is opposed to the board, and the first protrusion 30 or the second protrusion 36 is mounted in contact with the board. The first protrusion 30 and the second protrusion 36 are not limited to being formed by the manufacturing method described in the preferred embodiments, and may be formed by any suitable method.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a substantially rectangular parallelepiped multilayer body including a plurality of dielectric ceramic layers and a plurality of internal electrode layers laminated alternately in a lamination direction, the multilayer body further including a first main surface and a second main surface which are opposed to each other in the lamination direction, a first lateral surface and a second lateral surface which are opposed to each other in a width direction orthogonal or substantially orthogonal to the lamination direction, and a first end surface and a second end surface which are opposed to each other in a length direction orthogonal or substantially orthogonal to the lamination direction and the width direction; and
a pair of external electrodes provided at two ends of the multilayer body in the length direction to cover at least the first end surface and the second end surface, and connected to the internal electrode layers; wherein
a first protrusion is provided at each of four corners on a surface of at least one among the first main surface and the second main surface having a substantially rectangular shape;
the plurality of internal electrode layers include first internal electrode layers and second internal electrode layers which are adjacent to each other in the lamination direction;
each of the first internal electrode layers and the second internal electrode layers includes a counter portion which are opposed to each other in the lamination direction with the dielectric ceramic layer interposed therebetween;
each of the first internal electrode layers includes a first extension portion that extends from an end of the counter portion on the first end surface side toward the first end surface;

each of the second internal electrode layers includes a second extension portion that extends from an end of the counter portion on the second end surface side toward the second end surface;

the pair of external electrodes include a first external electrode that is provided on the first end surface side and connected to the first extension portions, and a second external electrode that is provided on the second end surface side and connected to the second extension portions;

the dielectric ceramic layers include a plurality of first dielectric ceramic layers, each provided between the first internal electrode layers and the second internal electrode layers, a second dielectric ceramic layer that is provided at a region where the internal electrode layers are not provided, between the first dielectric ceramic layers which are opposed to each other with the internal electrode layers interposed therebetween and overlaps in the lamination direction with the first dielectric ceramic layers, and a third dielectric ceramic layer provided at each of the first lateral surface and the second lateral surface of the multilayer body;

the multilayer body includes an inner layer portion in which the first internal electrode layers and the second internal electrode layers are laminated alternately with the plurality of dielectric ceramic layers interposed therebetween, and a pair of outer layer portions made of a ceramic material that sandwiches the inner layer portion in the lamination direction;

the plurality of internal electrode layers include a pair of first edge portions extending in the length direction at two ends in the width direction, and a pair of second edge portions extending in the width direction at two ends of the counter portions in the length direction;

the plurality of dielectric ceramic layers include a first peripheral portion between the pair of first edge portions opposed to each other in the lamination direction, a second peripheral portion between the pair of second edge portions opposed to each other in the lamination direction, and a central region surrounded by the first peripheral portion and the second peripheral portion;

the first peripheral portion and the second peripheral portion are thicker than the central region;

the plurality of dielectric ceramic layers each include intersections where the first peripheral portion and the second peripheral portion intersect with each other;

the plurality of dielectric ceramic layers at the intersections are thicker than the first peripheral portion and the second peripheral portion; and second protrusions are provided at portions corresponding to the intersections in the lamination direction on at least one selected from the first main surface and the second main surface.

2. The multilayer ceramic capacitor according to claim 1, wherein
the multilayer body includes raised portions that rise in the lamination direction and extend in the width direction at both ends in the length direction of the first main surface and the second main surface; and
the pair of external electrodes each cover the raised portions.

3. The multilayer ceramic capacitor according to claim 1, wherein the first internal electrode layers and the second internal electrode layers have the same or substantially the same rectangular or substantially rectangular shape.

4. The multilayer ceramic capacitor according to claim 1, wherein
a tip of each of the first extension portions is exposed at the first end surface; and
a tip of each of the second extension portions is exposed at the second end surface.

5. The multilayer ceramic capacitor according to claim 4, wherein
the tips of the first extension portions are in contact with the first external electrode; and
the tips of the second extension portions are in contact with the second external electrode.

6. The multilayer ceramic capacitor according to claim 1, wherein the pair of external electrodes include a laminated film including a sintered layer and a plating layer.

7. The multilayer ceramic capacitor according to claim 1, wherein the first protrusion of each of the four corners on the surface of the at least one among the first main surface and the second main surface have the same or substantially the same shape.

8. The multilayer ceramic capacitor according to claim 1, wherein total heights of the second protrusions are greater than total heights of the first protrusions.

9. The multilayer ceramic capacitor according to claim 1, wherein the first protrusion is provided at each of the four corners on only one of the first main surface and the second main surface.

* * * * *